US009823626B2

(12) United States Patent
Zornio et al.

(10) Patent No.: US 9,823,626 B2
(45) Date of Patent: Nov. 21, 2017

(54) REGIONAL BIG DATA IN PROCESS CONTROL SYSTEMS

(71) Applicant: FISHER-ROSEMOUNT SYSTEMS, INC., Round Rock, TX (US)

(72) Inventors: Peter Zornio, Austin, TX (US); Mark J. Nixon, Round Rock, TX (US); Wilhelm K. Wojsznis, Austin, TX (US); J. Michael Lucas, Leicester (GB); Eric D. Rotvold, West St. Paul, MN (US); Terrence L. Blevins, Round Rock, TX (US); Paul Richard Muston, Narborough (GB); Gary K. Law, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 523 days.

(21) Appl. No.: 14/507,188

(22) Filed: Oct. 6, 2014

(65) Prior Publication Data

US 2016/0098021 A1    Apr. 7, 2016

(51) Int. Cl.
*G05B 13/02*    (2006.01)
*G06F 17/30*    (2006.01)
(Continued)

(52) U.S. Cl.
CPC ......... *G05B 13/0265* (2013.01); *G06F 17/30* (2013.01); *G06N 5/022* (2013.01); *G06N 99/005* (2013.01)

(58) Field of Classification Search
CPC ... G05B 13/0265; G06F 17/005; G06F 17/30; G06N 5/022; G06N 99/005
USPC .......................................................... 700/47
See application file for complete search history.

(56) References Cited

U.S. PATENT DOCUMENTS 4,593,367 A    6/1986    Slack et al.
5,111,531 A    5/1992    Grayson et al.
(Continued)

FOREIGN PATENT DOCUMENTS

AU    2010257310 A1    7/2012
CN    102710861 A    10/2012
(Continued)

OTHER PUBLICATIONS

Hu et al., "Toward Scalable Systems for Big Data Analytics: A Technology Tutorial", IEEE, 2014, 36pg.*
(Continued)

*Primary Examiner* — Ryan Coyer
(74) *Attorney, Agent, or Firm* — Marshall, Gerstein & Borun LLP

(57) ABSTRACT

A regional big data node oversees or services, during real-time operations of a process plant or process control system, a respective region of a plurality of regions of the plant/system, where at least some of the regions each includes one or more process control devices that operate to control a process executed in the plant/system. The regional big data node is configured to receive and store, as big data, streamed data and learned knowledge that is generated, received, or observed by its respective region, and to perform one or more learning analyses on at least some of the stored data. As a result of the learning analyses, the regional big data node creates new learned knowledge which the regional big data node may use to modify operations in its respective region, and/or which the regional big data node may transmit to other big data nodes of the plant/system.

33 Claims, 4 Drawing Sheets

(51) Int. Cl.
*G06N 99/00* (2010.01)
*G06N 5/02* (2006.01)

(56) References Cited

U.S. PATENT DOCUMENTS

| | | | |
|---|---|---|---|
| 5,598,572 A | 1/1997 | Tanikoshi et al. |
| 5,801,942 A | 9/1998 | Nixon et al. |
| 5,801,946 A | 9/1998 | Nissen et al. |
| 5,828,851 A | 10/1998 | Nixon et al. |
| 5,838,563 A | 11/1998 | Dove et al. |
| 5,862,052 A | 1/1999 | Nixon et al. |
| 5,862,054 A | 1/1999 | Li |
| 5,909,368 A | 6/1999 | Nixon et al. |
| 5,940,294 A | 8/1999 | Dove |
| 5,980,078 A | 11/1999 | Krivoshein et al. |
| 5,988,847 A | 11/1999 | McLaughlin et al. |
| 5,995,916 A | 11/1999 | Nixon et al. |
| 6,032,208 A | 2/2000 | Nixon et al. |
| 6,078,320 A | 6/2000 | Dove et al. |
| 6,098,116 A | 8/2000 | Nixon et al. |
| 6,167,464 A | 12/2000 | Kretschmann |
| 6,178,504 B1 | 1/2001 | Fieres et al. |
| 6,195,591 B1 | 2/2001 | Nixon et al. |
| 6,266,726 B1 | 7/2001 | Nixon et al. |
| 6,285,966 B1 | 9/2001 | Brown et al. |
| 6,295,513 B1 | 9/2001 | Thackston |
| 6,324,877 B2 | 12/2001 | Neeley |
| 6,421,570 B1 | 7/2002 | McLaughlin et al. |
| 6,463,352 B1 | 10/2002 | Tadokoro et al. |
| 6,535,883 B1 | 3/2003 | Lee et al. |
| 6,563,430 B1 | 5/2003 | Kemink et al. |
| 6,658,114 B1 | 12/2003 | Farn et al. |
| 6,701,285 B2 | 3/2004 | Salonen |
| 6,715,078 B1 | 3/2004 | Chasko et al. |
| 6,768,116 B1 | 7/2004 | Berman et al. |
| 6,847,850 B2 | 1/2005 | Grumelart |
| 6,868,538 B1 | 3/2005 | Nixon et al. |
| 6,965,886 B2 | 11/2005 | Govrin et al. |
| 6,970,758 B1 | 11/2005 | Shi et al. |
| 7,072,722 B1 | 7/2006 | Colonna et al. |
| 7,123,974 B1 | 10/2006 | Hamilton |
| 7,143,149 B2 | 11/2006 | Oberg et al. |
| 7,213,057 B2 | 5/2007 | Trethewey |
| 7,222,131 B1 | 5/2007 | Grewal et al. |
| 7,283,914 B2 | 10/2007 | Poorman et al. |
| 7,283,971 B1 | 10/2007 | Levine et al. |
| 7,314,169 B1 | 1/2008 | Jasper et al. |
| 7,346,404 B2 | 3/2008 | Eryurek et al. |
| 7,530,113 B2 | 5/2009 | Braun |
| 7,536,548 B1 | 5/2009 | Batke et al. |
| RE40,817 E | 6/2009 | Krivoshein et al. |
| 7,541,920 B2 | 6/2009 | Tambascio et al. |
| 7,548,873 B2 | 6/2009 | Veeningen et al. |
| 7,565,306 B2 | 7/2009 | Apostolides |
| 7,598,856 B1 | 10/2009 | Nick et al. |
| 7,606,681 B2 | 10/2009 | Esmaili et al. |
| 7,616,095 B2 | 11/2009 | Jones et al. |
| 7,617,542 B2 | 11/2009 | Vataja |
| 7,630,914 B2 | 12/2009 | Veeningen et al. |
| 7,644,052 B1 | 1/2010 | Chang et al. |
| 7,653,563 B2 | 1/2010 | Veeningen et al. |
| 7,668,608 B2 | 2/2010 | Nixon et al. |
| 7,676,281 B2 | 3/2010 | Hood et al. |
| 7,680,546 B2 | 3/2010 | Gilbert et al. |
| 7,684,877 B2 | 3/2010 | Weatherhead et al. |
| 7,716,489 B1 | 5/2010 | Brandt et al. |
| 7,720,727 B2 | 5/2010 | Keyes et al. |
| 7,827,122 B1 | 11/2010 | Campbell, Jr. et al. |
| 7,853,431 B2 | 12/2010 | Samardzija et al. |
| 7,925,979 B2 | 4/2011 | Forney et al. |
| 7,930,639 B2 | 4/2011 | Baier et al. |
| 7,934,095 B2 | 4/2011 | Laberteaux et al. |
| 7,962,440 B2 | 6/2011 | Baier et al. |
| 8,014,722 B2 | 9/2011 | Abel et al. |
| 8,055,787 B2 | 11/2011 | Victor et al. |
| 8,060,834 B2 | 11/2011 | Lucas et al. |
| 8,073,967 B2 | 12/2011 | Peterson et al. |
| 8,102,400 B1 | 1/2012 | Cook et al. |
| 8,132,225 B2 | 3/2012 | Chand et al. |
| 8,166,296 B2 | 4/2012 | Buer et al. |
| 8,171,137 B1 | 5/2012 | Parks et al. |
| 8,185,495 B2 | 5/2012 | Clark et al. |
| 8,185,871 B2 | 5/2012 | Nixon et al. |
| 8,190,888 B2 | 5/2012 | Batke et al. |
| 8,191,005 B2 | 5/2012 | Baier et al. |
| 8,214,455 B2 | 7/2012 | Baier et al. |
| 8,218,651 B1 | 7/2012 | Eshet et al. |
| 8,219,669 B2 | 7/2012 | Agrusa et al. |
| 8,224,496 B2 | 7/2012 | Musti et al. |
| 8,316,313 B2 | 11/2012 | Campney et al. |
| 8,321,663 B2 | 11/2012 | Medvinsky et al. |
| 8,327,130 B2 | 12/2012 | Wilkinson, Jr. et al. |
| 8,350,666 B2 | 1/2013 | Kore |
| 8,417,595 B2 | 4/2013 | Keyes et al. |
| 8,521,332 B2 | 8/2013 | Tiemann et al. |
| 8,688,780 B2 | 4/2014 | Gordon et al. |
| 8,832,236 B2 | 9/2014 | Hernandez et al. |
| 9,021,021 B2 | 4/2015 | Backholm et al. |
| 9,024,972 B1 | 5/2015 | Bronder et al. |
| 9,038,043 B1 | 5/2015 | Fleetwood et al. |
| 9,088,665 B2 | 7/2015 | Boyer et al. |
| 9,119,166 B1 | 8/2015 | Sheikh |
| 9,122,786 B2 | 9/2015 | Cammert et al. |
| 9,229,871 B2 | 1/2016 | Washiro |
| 9,361,320 B1 | 6/2016 | Vijendra et al. |
| 9,397,836 B2 | 7/2016 | Nixon et al. |
| 9,424,398 B1 | 8/2016 | McLeod et al. |
| 9,430,114 B1 | 8/2016 | Dingman et al. |
| 9,459,809 B1 | 10/2016 | Chen et al. |
| 9,541,905 B2 | 1/2017 | Nixon et al. |
| 9,558,220 B2 | 1/2017 | Nixon et al. |
| 2002/0010694 A1 | 1/2002 | Navab et al. |
| 2002/0035495 A1 | 3/2002 | Spira et al. |
| 2002/0052715 A1 | 5/2002 | Maki |
| 2002/0064138 A1 | 5/2002 | Saito et al. |
| 2002/0120475 A1 | 8/2002 | Morimoto |
| 2002/0128998 A1 | 9/2002 | Kil et al. |
| 2002/0130846 A1 | 9/2002 | Nixon et al. |
| 2002/0138168 A1 | 9/2002 | Salonen |
| 2002/0149497 A1 | 10/2002 | Jaggi |
| 2002/0169514 A1 | 11/2002 | Eryurek et al. |
| 2003/0020726 A1 | 1/2003 | Charpentier |
| 2003/0023795 A1 | 1/2003 | Packwood et al. |
| 2003/0028495 A1 | 2/2003 | Pallante |
| 2003/0061295 A1 | 3/2003 | Oberg et al. |
| 2003/0083756 A1 | 5/2003 | Hsiung et al. |
| 2003/0154044 A1 | 8/2003 | Lundstedt et al. |
| 2003/0195934 A1 | 10/2003 | Peterson et al. |
| 2004/0093102 A1 | 5/2004 | Liiri et al. |
| 2004/0117233 A1 | 6/2004 | Rapp |
| 2004/0153437 A1 | 8/2004 | Buchan |
| 2004/0203874 A1 | 10/2004 | Brandt et al. |
| 2004/0204775 A1 | 10/2004 | Keyes et al. |
| 2004/0210330 A1 | 10/2004 | Birkle |
| 2004/0230328 A1 | 11/2004 | Armstrong et al. |
| 2004/0233930 A1 | 11/2004 | Colby |
| 2005/0005259 A1 | 1/2005 | Avery et al. |
| 2005/0062677 A1 | 3/2005 | Nixon et al. |
| 2005/0080799 A1 | 4/2005 | Harnden et al. |
| 2005/0130634 A1 | 6/2005 | Godfrey |
| 2005/0164684 A1 | 7/2005 | Chen et al. |
| 2005/0182650 A1 | 8/2005 | Maddox et al. |
| 2005/0187649 A1 | 8/2005 | Funk et al. |
| 2005/0213768 A1 | 9/2005 | Durham et al. |
| 2005/0222691 A1 | 10/2005 | Glas et al. |
| 2005/0264527 A1 | 12/2005 | Lin |
| 2006/0031826 A1 | 2/2006 | Hiramatsu et al. |
| 2006/0064291 A1 | 3/2006 | Pattipatti et al. |
| 2006/0064472 A1 | 3/2006 | Mirho |
| 2006/0069717 A1 | 3/2006 | Mamou et al. |
| 2006/0087402 A1 | 4/2006 | Manning et al. |
| 2006/0168396 A1 | 7/2006 | LaMothe et al. |
| 2006/0200260 A1 | 9/2006 | Hoffberg et al. |
| 2006/0200771 A1 | 9/2006 | Nielsen et al. |

(56) References Cited

U.S. PATENT DOCUMENTS

| | | |
|---|---|---|
| 2006/0218107 A1 | 9/2006 | Young |
| 2006/0241792 A1 | 10/2006 | Pretlove et al. |
| 2006/0288091 A1 | 12/2006 | Oh et al. |
| 2007/0005266 A1 | 1/2007 | Blevins et al. |
| 2007/0038889 A1 | 2/2007 | Wiggins et al. |
| 2007/0067725 A1 | 3/2007 | Cahill et al. |
| 2007/0078696 A1 | 4/2007 | Hardin |
| 2007/0112574 A1 | 5/2007 | Greene |
| 2007/0130310 A1 | 6/2007 | Batke et al. |
| 2007/0132779 A1 | 6/2007 | Gilbert et al. |
| 2007/0139441 A1 | 6/2007 | Lucas et al. |
| 2007/0179645 A1 | 8/2007 | Nixon et al. |
| 2007/0185754 A1 | 8/2007 | Schmidt |
| 2007/0250292 A1 | 10/2007 | Alagappan et al. |
| 2007/0265866 A1 | 11/2007 | Fehling et al. |
| 2008/0040719 A1 | 2/2008 | Shimizu et al. |
| 2008/0065243 A1 | 3/2008 | Fallman et al. |
| 2008/0076431 A1 | 3/2008 | Fletcher et al. |
| 2008/0079596 A1 | 4/2008 | Baier et al. |
| 2008/0082180 A1 | 4/2008 | Blevins et al. |
| 2008/0082181 A1 | 4/2008 | Miller et al. |
| 2008/0082195 A1 | 4/2008 | Samardzija |
| 2008/0097622 A1 | 4/2008 | Forney et al. |
| 2008/0103843 A1 | 5/2008 | Goeppert et al. |
| 2008/0104189 A1 | 5/2008 | Baker et al. |
| 2008/0126352 A1 | 5/2008 | Case |
| 2008/0143482 A1 | 6/2008 | Shoarinejad et al. |
| 2008/0174766 A1 | 7/2008 | Haaslahti et al. |
| 2008/0182592 A1 | 7/2008 | Cha et al. |
| 2008/0209443 A1 | 8/2008 | Suzuki |
| 2008/0274766 A1 | 11/2008 | Pratt et al. |
| 2008/0288321 A1 | 11/2008 | Dillon et al. |
| 2008/0297513 A1 | 12/2008 | Greenhill et al. |
| 2008/0301123 A1 | 12/2008 | Schneider et al. |
| 2009/0049073 A1 | 2/2009 | Cho |
| 2009/0065578 A1 | 3/2009 | Peterson et al. |
| 2009/0070337 A1 | 3/2009 | Romem et al. |
| 2009/0070589 A1 | 3/2009 | Nayak et al. |
| 2009/0089359 A1 | 4/2009 | Siorek et al. |
| 2009/0097502 A1 | 4/2009 | Yamamoto |
| 2009/0112335 A1 | 4/2009 | Mehta et al. |
| 2009/0210814 A1 | 8/2009 | Agrusa et al. |
| 2009/0216341 A1 | 8/2009 | Enkerud et al. |
| 2009/0249237 A1 | 10/2009 | Jundt et al. |
| 2009/0294174 A1 | 12/2009 | Harmer et al. |
| 2009/0300535 A1 | 12/2009 | Skourup et al. |
| 2009/0319058 A1 | 12/2009 | Rovaglio et al. |
| 2009/0325603 A1 | 12/2009 | Van Os et al. |
| 2010/0036779 A1 | 2/2010 | Sadeh-Koniecpol et al. |
| 2010/0069008 A1 | 3/2010 | Oshima et al. |
| 2010/0076642 A1 | 3/2010 | Hoffberg et al. |
| 2010/0106282 A1 | 4/2010 | Mackelprang et al. |
| 2010/0127821 A1 | 5/2010 | Jones et al. |
| 2010/0127824 A1 | 5/2010 | Moschl et al. |
| 2010/0145476 A1 | 6/2010 | Junk et al. |
| 2010/0169785 A1 | 7/2010 | Jesudason |
| 2010/0185857 A1 | 7/2010 | Neitzel et al. |
| 2010/0190442 A1 | 7/2010 | Citrano, III et al. |
| 2010/0192122 A1 | 7/2010 | Esfahan et al. |
| 2010/0222899 A1 | 9/2010 | Blevins et al. |
| 2010/0262929 A1 | 10/2010 | Avery |
| 2010/0286798 A1 | 11/2010 | Keyes et al. |
| 2010/0290351 A1 | 11/2010 | Toepke et al. |
| 2010/0293019 A1 | 11/2010 | Keyes et al. |
| 2010/0293564 A1 | 11/2010 | Gould et al. |
| 2010/0305736 A1 | 12/2010 | Arduini |
| 2010/0318934 A1 | 12/2010 | Blevins et al. |
| 2011/0022193 A1 | 1/2011 | Panaitescu |
| 2011/0046754 A1 | 2/2011 | Bromley et al. |
| 2011/0071869 A1 | 3/2011 | O'Brien et al. |
| 2011/0098918 A1 | 4/2011 | Siliski et al. |
| 2011/0115816 A1 | 5/2011 | Brackney |
| 2011/0130848 A1 | 6/2011 | Tegnell et al. |
| 2011/0140864 A1 | 6/2011 | Bucci |
| 2011/0144777 A1 | 6/2011 | Firkins et al. |
| 2011/0191277 A1 | 8/2011 | Agúndez Dominguez et al. |
| 2011/0258138 A1 | 10/2011 | Kulkarni et al. |
| 2011/0276896 A1 | 11/2011 | Zambetti et al. |
| 2011/0276908 A1 | 11/2011 | O'Riordan |
| 2011/0295722 A1 | 12/2011 | Reisman |
| 2012/0004743 A1 | 1/2012 | Anne et al. |
| 2012/0005270 A1 | 1/2012 | Harding et al. |
| 2012/0010758 A1 | 1/2012 | Francino et al. |
| 2012/0011180 A1 | 1/2012 | Kavaklioglu |
| 2012/0011511 A1 | 1/2012 | Horvitz et al. |
| 2012/0029661 A1 | 2/2012 | Jones et al. |
| 2012/0038458 A1 | 2/2012 | Toepke et al. |
| 2012/0040698 A1 | 2/2012 | Ferguson et al. |
| 2012/0078869 A1 | 3/2012 | Bellville et al. |
| 2012/0095574 A1 | 4/2012 | Greenlee |
| 2012/0147862 A1 | 6/2012 | Poojary et al. |
| 2012/0163521 A1 | 6/2012 | Kirrmann et al. |
| 2012/0176491 A1 | 7/2012 | Garin et al. |
| 2012/0203728 A1 | 8/2012 | Levine |
| 2012/0230309 A1 | 9/2012 | Junk |
| 2012/0239164 A1 | 9/2012 | Smith et al. |
| 2012/0271962 A1 | 10/2012 | Ivanov et al. |
| 2012/0290795 A1 | 11/2012 | Dowlatkhah |
| 2012/0331541 A1 | 12/2012 | Hamilton, II et al. |
| 2013/0006696 A1 | 1/2013 | Louie et al. |
| 2013/0007223 A1 | 1/2013 | Luby et al. |
| 2013/0013523 A1 | 1/2013 | Herrera Campos |
| 2013/0029686 A1 | 1/2013 | Moshfeghi |
| 2013/0041479 A1 | 2/2013 | Zhang et al. |
| 2013/0086591 A1 | 4/2013 | Haven |
| 2013/0095849 A1 | 4/2013 | Pakzad |
| 2013/0144404 A1 | 6/2013 | Godwin et al. |
| 2013/0144405 A1 | 6/2013 | Lo |
| 2013/0144605 A1 | 6/2013 | Brager et al. |
| 2013/0169526 A1 | 7/2013 | Gai et al. |
| 2013/0212129 A1 | 8/2013 | Lawson et al. |
| 2013/0214902 A1 | 8/2013 | Pineau et al. |
| 2013/0231947 A1 | 9/2013 | Shusterman |
| 2013/0265857 A1 | 10/2013 | Foulds et al. |
| 2014/0015672 A1 | 1/2014 | Ponce |
| 2014/0039648 A1 | 2/2014 | Boult et al. |
| 2014/0067800 A1 | 3/2014 | Sharma |
| 2014/0079297 A1 | 3/2014 | Tadayon et al. |
| 2014/0089504 A1 | 3/2014 | Scholz et al. |
| 2014/0122806 A1 | 5/2014 | Lin et al. |
| 2014/0123276 A1 | 5/2014 | Bush et al. |
| 2014/0136652 A1 | 5/2014 | Narayanaswami et al. |
| 2014/0164603 A1 | 6/2014 | Castel et al. |
| 2014/0172961 A1 | 6/2014 | Clemmer et al. |
| 2014/0189520 A1 | 7/2014 | Crepps et al. |
| 2014/0201244 A1 | 7/2014 | Zhou |
| 2014/0232843 A1 | 8/2014 | Campbell |
| 2014/0250153 A1 | 9/2014 | Nixon et al. |
| 2014/0267599 A1 | 9/2014 | Drouin et al. |
| 2014/0273847 A1 | 9/2014 | Nixon et al. |
| 2014/0274123 A1 | 9/2014 | Nixon et al. |
| 2014/0277593 A1 | 9/2014 | Nixon et al. |
| 2014/0277594 A1 | 9/2014 | Nixon et al. |
| 2014/0277595 A1 | 9/2014 | Nixon et al. |
| 2014/0277596 A1 | 9/2014 | Nixon et al. |
| 2014/0277604 A1 | 9/2014 | Nixon et al. |
| 2014/0277605 A1 | 9/2014 | Nixon et al. |
| 2014/0277607 A1 | 9/2014 | Nixon et al. |
| 2014/0277615 A1 | 9/2014 | Nixon et al. |
| 2014/0277616 A1 | 9/2014 | Nixon et al. |
| 2014/0277617 A1 | 9/2014 | Nixon et al. |
| 2014/0277618 A1 | 9/2014 | Nixon et al. |
| 2014/0277656 A1 | 9/2014 | Nixon et al. |
| 2014/0278312 A1 | 9/2014 | Nixon et al. |
| 2014/0280497 A1 | 9/2014 | Nixon et al. |
| 2014/0280678 A1 | 9/2014 | Nixon et al. |
| 2014/0282015 A1 | 9/2014 | Nixon et al. |
| 2014/0282227 A1 | 9/2014 | Nixon et al. |
| 2014/0282257 A1 | 9/2014 | Nixon et al. |
| 2014/0297225 A1 | 10/2014 | Petroski et al. |
| 2014/0316579 A1 | 10/2014 | Taylor et al. |
| 2014/0358256 A1 | 12/2014 | Billi et al. |
| 2014/0359552 A1 | 12/2014 | Misra et al. |
| 2014/0372561 A1 | 12/2014 | Hisano |

(56) References Cited

U.S. PATENT DOCUMENTS

| | | |
|---|---|---|
| 2015/0024710 A1 | 1/2015 | Becker et al. |
| 2015/0067163 A1 | 3/2015 | Bahnsen et al. |
| 2015/0106578 A1 | 4/2015 | Warfield et al. |
| 2015/0172872 A1 | 6/2015 | Alsehly et al. |
| 2015/0177718 A1 | 6/2015 | Vartiainen et al. |
| 2015/0220080 A1 | 8/2015 | Nixon et al. |
| 2015/0222731 A1 | 8/2015 | Shinohara et al. |
| 2015/0246852 A1 | 9/2015 | Chen et al. |
| 2015/0261215 A1 | 9/2015 | Blevins et al. |
| 2015/0332188 A1 | 11/2015 | Yankelevich et al. |
| 2016/0098037 A1 | 4/2016 | Zornio et al. |
| 2016/0098388 A1 | 4/2016 | Blevins et al. |
| 2016/0098647 A1 | 4/2016 | Nixon et al. |
| 2016/0132046 A1 | 5/2016 | Beoughter et al. |
| 2016/0327942 A1 | 11/2016 | Nixon et al. |
| 2017/0102678 A1 | 4/2017 | Nixon et al. |
| 2017/0102693 A1 | 4/2017 | Kidd et al. |
| 2017/0102694 A1 | 4/2017 | Enver et al. |
| 2017/0102696 A1 | 4/2017 | Bell et al. |
| 2017/0103103 A1 | 4/2017 | Nixon et al. |
| 2017/0115648 A1 | 4/2017 | Nixon et al. |

FOREIGN PATENT DOCUMENTS

| | | |
|---|---|---|
| CN | 104049575 A | 9/2014 |
| DE | 19882113 T1 | 1/2000 |
| DE | 19882117 T1 | 1/2000 |
| EP | 0 335 957 A1 | 10/1989 |
| EP | 1 344 291 A1 | 9/2003 |
| EP | 1 414 215 A2 | 4/2004 |
| EP | 1 564 647 A2 | 8/2005 |
| EP | 1 912 376 A1 | 4/2008 |
| EP | 2 003 813 A1 | 12/2008 |
| EP | 2 112 614 A1 | 10/2009 |
| EP | 2 469 475 A1 | 6/2012 |
| EP | 1 344 291 B1 | 8/2012 |
| EP | 2 685 329 A1 | 1/2014 |
| EP | 2 801 939 A1 | 11/2014 |
| FR | 2 966 625 A1 | 4/2012 |
| GB | 2 336 977 B | 11/1999 |
| GB | 2 336 923 B | 6/2002 |
| GB | 2 403 028 A | 12/2004 |
| GB | 2 453 426 A | 4/2009 |
| GB | 2 512 984 A | 10/2014 |
| GB | 2 512 997 A | 10/2014 |
| GB | 2 532 849 A | 6/2016 |
| GB | 2 534 628 A | 8/2016 |
| GB | 2 537 457 A | 10/2016 |
| JP | 08-234951 | 9/1996 |
| JP | 2001-512593 A | 8/2001 |
| JP | 2006-221376 A | 8/2006 |
| JP | 2007-536631 A | 12/2007 |
| JP | 2007-536648 A | 12/2007 |
| JP | 2009-140380 A | 6/2009 |
| JP | 2012-084162 A | 4/2012 |
| JP | 4-934482 B2 | 5/2012 |
| JP | 2014-116027 A | 6/2014 |
| WO | WO-02/50971 | 6/2002 |
| WO | WO-03/073688 A1 | 9/2003 |
| WO | WO-2005/083533 A1 | 9/2005 |
| WO | WO-2005/109123 A1 | 11/2005 |
| WO | WO-2008/042786 A2 | 4/2008 |
| WO | WO-2009/046095 A1 | 4/2009 |
| WO | WO-2011/120625 A1 | 10/2011 |
| WO | WO-2012/022381 A1 | 2/2012 |
| WO | WO-2014/005073 A1 | 1/2014 |
| WO | WO-2015/138706 A1 | 9/2015 |

OTHER PUBLICATIONS

Lee et al., "Recent Advances and Trends in predictive manufacturing systems in big data environment", Elsevier Ltd., 2013, 4pg.*

Mandavi et al., "Development of a simulation-based decision support system for controlling stochastic flexible job shop manufacturing systems", Simulation Modelling Practice and Theory 18 (2010) 768-786, 2010, 19pg.*

Mezmaz et al., "A Parallel Bi-objective Hybrid Metaheuristic for Energy-aware Scheduling for Cloud Computing Systems", Journal of Parallel and Distributed Computing, Elsevier, 2011, 35pg.*

Xu, Xun, "From cloud computing to cloud manufacturing", Robotics and Computer-Integrated Manufacturing 28 75-86, (2012) 12pg.*

Communication Relating to the Results of the Partial International Search, dated Jul. 11, 2014.

International Search Report and Written Opinion for Application No. PCT/US2014/030627, dated Sep. 11, 2014.

U.S. Appl. No. 13/784,041, filed Mar. 4, 2013.

U.S. Appl. No. 14/028,785, filed Sep. 17, 2013.

U.S. Appl. No. 14/028,897, filed Sep. 17, 2013.

U.S. Appl. No. 14/028,913, filed Sep. 17, 2013.

U.S. Appl. No. 14/028,921, filed Sep. 17, 2013.

U.S. Appl. No. 14/028,923, filed Sep. 17, 2013.

U.S. Appl. No. 14/028,964, filed Sep. 17, 2013.

Search Report for Application No. GB1513617.9, dated Jan. 21, 2016.

International Search Report and Written Opinion for Application No. PCT/US2015,053931, dated Jan. 26, 2016.

Krumeich et al., "Big Data Analytics for Predictive Manufacturing Control—A Case Study from Process Industry," IEEE International Congress on Big Data, pp. 530-537 (2014).

Bassat et al., "Workflow Management Combined with Diagnostic and Repair Expert System Tools for Maintenance Operations," IEEE, pp. 367-375 (1993).

Search Report for Application No. GB1501042.4, dated Feb. 2, 2016.

Search Report for Application No. GB1517034.3, dated May 26, 2016.

Search Report for Application No. GB1517038.4, dated Mar. 22, 2016.

Adrian et al., "Model Predictive Control of Integrated Unit Operations Control of a Divided Wall Column," Chemical Engineering and Processing: Process Information, 43(3):347-355 (2004).

Daniel et al., "Conceptual Design of Reactive Dividing Wall Columns," Symposium Series No. 152, pp. 364-372 (2006).

Dejanovic et al., "Conceptual Design and Comparison of Four-Products Dividing Wall Columns for Separation of a Multicomponent Aromatics Mixture," Distillation Absorption, pp. 85-90 (2010).

Dongargaonkar et al., "PLC Based Ignition System," Conference Records of the 1999 IEEE Industry Application Conference, 1380-1387 (1999).

Hiller et al., "Multi Objective Optimisation for an Economical Dividing Wall Column Design," Distillation Absorption, pp. 67-72 (2010).

International Preliminary Report on Patentability for Application No. PCT/US2014/030627, dated Sep. 15, 2015.

International Preliminary Report on Patentability for Application No. PCT/US2015/020148, dated Sep. 14, 2016.

Kiss et al., "A control Perspective on Process Intensification in Dividing-Wall Columns," Chemical Engineering and Processing: Process Intensification, 50:281-292 (2011).

Pendergast et al., "Consider Dividing Wall Columns," Chemical Processing (2008). Retrieved from the Internet at: URL:http://www.chemicalprocessing.com/articles/2008/245/?show=all.

Sander et al., "Methyl Acetate Hydrolysis in a Reactive Divided Wall Column," Symposium Series No. 152, pp. 353-363 (2006).

Schultz et al., "Reduce Costs with Dividing-Wall Columns," Reactions and Separations, pp. 64-71 (2002).

Shah et al., "Multicomponent Distillation Configurations with Large Energy Savings," Distillation Absorption, pp. 61-66 (2010).

Thotla et al., "Cyclohexanol Production from Cyclohexene in a Reactive Divided Wall Column: A Feasibility Study," Distillation Absorption, pp. 319-324 (2010).

(56) References Cited

OTHER PUBLICATIONS

Tututi-Avila et al., "Analysis of Multi-Loop Control Structures of Dividing-Wall Distillation Columns Using a Fundamental Model," Processes, 2:180-199 (2014).
U.S. Office Action for U.S. Appl. No. 13/784,041 dated Apr. 6, 2015.
U.S. Office Action for U.S. Appl. No. 13/784,041, dated Feb. 26, 2016.
U.S. Office Action for U.S. Appl. No. 13/784,041, dated Oct. 15, 2015.
"ANSI/ISA-S5.4-1991 American National Standard Instrument Loop Diagrams" by Instrument Society of America, 1986, 22 pages.
"IoT and Big Data Combine Forces," (2013). Retrieved from the Internet at: URL:http://wiki.advantech.corniimages/7/73/iot2013_whitepaper.pdf.
Bryner, "Smart Manufacturing: The Next Revolution," Chemical Engineering Process (2012). Retrieved from the Internet at: URL:http://www.aiche.org/sites/default/files/cep/20121004a.pdf.
Building Smarter Manufacturing with the Internet of Things (IoT), (2014). Retrieved from the Internet at: URL:http://www.cisco.com/web/solutions/trends/iot/iot_in_manufacturing_january.pdf.
Examination Report for Application No. GB1017192.4, dated May 28, 2014.
Examination Report for Application No. GB1017192.4, dated Sep. 5, 2013.
First Office Action for Chinese Application No. 201010589029.X, dated Dec. 10, 2013.
International Search Report and Written Opinion for Application No. PCT/US2015/020148, dated Jun. 18, 2015.
Notice of Reasons for Rejection for Japanese Application No. 2010-229513, dated Jul. 29, 2014.
Search Report for Application No. GB1017192.4, dated Feb. 15, 2011.
Search Report for Application No. GB1403407.8, dated Aug. 8, 2014.
Search Report for Application No. GB1403408.6, dated Aug. 8, 2014.
Search Report for Application No. GB1403471.4, dated Sep. 9, 2014.
Search Report for Application No. GB1403472.2, dated Aug. 22, 2014.
Search Report for Application No. GB1403474.8, dated Aug. 26, 2014.
Search Report for Application No. GB1403475.5, dated Sep. 3, 2014.
Search Report for Application No. GB1403476.3, dated Aug. 27, 2014.
Search Report for Application No. GB1403477.1, dated Aug. 28, 2014.
Search Report for Application No. GB1403478.9, dated Aug. 21, 2014.
Search Report for Application No. GB1403480.5, dated Aug. 28, 2014.
Search Report for Application No. GB1403615.6, dated Aug. 18, 2014.
Search Report for Application No. GB1403616.4, dated Sep. 1, 2014.
Smalley, "GE Invests in Project to Embed Predictive Analytics in Industrial Internet," (2013). Retrieved from the Internet at: URL:http://data-informed.com/ge-invents-in-project-to-embed-predictive-analytics-in-industrial-internet/.
U.S. Appl. No. 14/174,413, entitled "Collecting and Delivering Data to a Big Data Machine in a Process Control System", filed Feb. 6, 2014, 61 pages.
U.S. Appl. No. 14/212,493, entitled "Distributed Big Data in a Process Control System", filed Mar. 14, 2014, 61 pages.
"Control Loop Foundation—Batch and Continuous Processes", by Terrence Blevins and Mark Nixon, International Society of Automation, 2011, Chapter 7.
Search Report for Application No. GB1402311.3, dated Aug. 6, 2014.
Search Report for Application No. GB1403251.0, dated Aug. 8, 2014.
Woo, "Intel Drops a Big Data Shocker", downloaded from the Internet at: <http://forbes.com/sites/bwoo/2013/02/27/intel-drops-a-big-data-shocker/?partner=ya> dated Feb. 27, 2013.
U.S. Appl. No. 14/212,411, filed Mar. 14, 2014, "Determining Associations and Alignments of Process Elements and Measurements in a Process".
Examination Report for Application No. EP 14724871.0, dated Aug. 17, 2016.
Notification of First Office Action for Chinese Application No. 201480014734.3, dated Apr. 19, 2017.
Razik et al., "The Remote Surveillance Device in Monitoring and Diagnosis of Induction Motor by Using a PDA," IEEE (2007).
Search Report for Application No. GB1617019.3, dated Feb. 27, 2017.
Siltanen et al., "Augmented Reality for Plant Lifecycle Management," IEEE (2007).

* cited by examiner

REGIONAL BIG DATA IN PROCESS CONTROL SYSTEMS

CROSS REFERENCE TO RELATED APPLICATIONS

This application is related to U.S. application Ser. No. 62/060,408, entitled "DATA PIPELINE FOR PROCESS CONTROL SYSTEM ANALYTICS" and filed concurrently herewith, the entire disclosure of which is hereby incorporated by reference herein. This application is also related to U.S. application Ser. No. 14/506,863, entitled "STREAMING DATA FOR ANALYTICS IN PROCESS CONTROL SYSTEMS" and filed concurrently herewith, the entire disclosure of which is hereby incorporated by reference herein. Additionally, this application is related to U.S. application Ser. No. 14/507,252, entitled "AUTOMATIC SIGNAL PROCESSING-BASED LEARNING IN A PROCESS PLANT" and filed concurrently herewith, the entire disclosure of which is hereby incorporated by reference herein.

Further, the present disclosure is related to U.S. patent application Ser. No. 13/784,041, entitled "BIG DATA IN PROCESS CONTROL SYSTEMS" and filed Mar. 3, 2013; U.S. patent application Ser. No. 14/028,785, entitled "METHOD AND APPARATUS FOR CONTROLLING A PROCESS PLANT WITH LOCATION AWARE MOBILE CONTROL DEVICES" and filed Sep. 17, 2013; U.S. patent application Ser. No. 14/174,413, entitled "COLLECTING AND DELIVERING DATA TO A BIG DATA MACHINE IN A PROCESS CONTROL SYSTEM" and filed Feb. 6, 2014; U.S. patent application Ser. No. 14/212,493, entitled "DISTRIBUTED BIG DATA IN A PROCESS CONTROL SYSTEM" and filed Mar. 14, 2014; and U.S. patent application Ser. No. 14/212,411, entitled "DETERMINING ASSOCIATIONS AND ALIGNMENTS OF PROCESS ELEMENTS AND MEASUREMENTS IN A PROCESS" and filed Mar. 14, 2014, the entire disclosures of each of which are hereby expressly incorporated by reference.

TECHNICAL FIELD

The present disclosure relates generally to process plants and to process control systems, and more particularly, to the use of regional big data in process plants and process control systems.

BACKGROUND

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more processes executing within the process plant or system and/or being controlled by the process plant or system. The one or more processes may be at least in part physical processes, e.g., manufacturing, refining, production, etc. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as setpoints, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

The architecture of currently known process control plants and process control systems is strongly influenced by limited controller and device memory, communications bandwidth and controller and device processor capability. For example, in currently known process control system architectures, the use of dynamic and static non-volatile memory in the controller is usually minimized or, at the least, managed carefully. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

Additionally, to minimize controller memory usage in currently known process control systems, selected data that is to be archived or saved (as indicated by the configuration of the controller) is reported to the workstation or computing device for storage at an appropriate data historian or data silo. The current techniques used to report the data poorly utilizes communication resources and induces excessive controller loading. Additionally, due to the time delays in communication and sampling at the historian or silo, the data collection and time stamping is often out of sync with the actual process.

Similarly, in batch process control systems, to minimize controller memory usage, batch recipes and snapshots of controller configuration typically remain stored at a centralized administrative computing device or location (e.g., at a data silo or historian), and are only transferred to a controller when needed. Such a strategy introduces significant burst loads in the controller and in communications between the workstation or centralized administrative computing device and the controller.

Furthermore, the capability and performance limitations of relational databases of currently known process control systems, combined with the previous high cost of disk storage, play a large part in structuring data into independent entities or silos to meet the objectives of specific applications. For example, within the DeltaV™ system, the archiving of process models, continuous historical data, and batch and event data are saved in three different application databases or silos of data. Each silo has a different interface to access the data stored therein.

Structuring data in this manner creates a barrier in the way that historized data is accessed and used. For example, the root cause of variations in product quality may be associated with data in more than of these data silos. However, because of the different file structures of the silos, it is not possible to provide tools that allow this data to be quickly and easily accessed for analysis. Further, audit or synchronizing functions must be performed to ensure that data across different silos is consistent.

The limitations of currently known process plants and process control system discussed above and other limitations may undesirably manifest themselves in the operation and optimization of process plants or process control systems, for instance, during plant operations, trouble shooting, and/or predictive modeling. For example, such limitations force cumbersome and lengthy work flows that must be performed in order to obtain data for troubleshooting and generating updated models. Additionally, the obtained data may be inaccurate due to data compression, insufficient bandwidth, or shifted time stamps.

"Big data" generally refers to a collection of one or more data sets that are so large or complex that traditional database management tools and/or data processing applications (e.g., relational databases and desktop statistic packages) are not able to manage the data sets within a tolerable amount of time. Typically, applications that use big data are transactional and end-user directed or focused. For example, web search engines, social media applications, marketing applications and retail applications may use and manipulate big data. Big data may be supported by a distributed database which allows the parallel processing capability of modern multi-process, multi-core servers to be fully utilized.

SUMMARY

An embodiment of a regional big data node for supporting big data in a process plant or process control system that is controlling a process includes a network interface that communicatively connects the regional big data node to one of a plurality of regions of the process plant or process control system. The one of the plurality of regions comprises a plurality of local big data nodes, each of which transmits, in real-time, data generated from the control of the process by the process plant or process control system as the process is being controlled in real-time. The regional big data node also includes a big data storage area comprising one or more tangible, non-transitory, computer-readable storage media configured to store regional big data. Further, the regional big data node includes a big data receiver configured to receive the data transmitted by the plurality of local big data nodes and received at the regional big data node via the network interface, and store the received data in the big data storage area. Additionally, the regional big data node includes a big data analyzer configured to perform a learning analysis on at least a portion of the regional big data, generate learned knowledge based on a result of the learning analysis, and cause a change in operations of at least a portion of the process plant or system based on the result of the learning analysis including causing the learned knowledge to be transmitted to a recipient big data node corresponding to the at least the portion of the process plant or process control system.

An embodiment of a method of utilizing regional big data to improve the operation of a process plant or process control system that is controlling a process includes collecting data at one or more regional big data nodes of the process plant or system. Each of the one or more regional big data nodes corresponds to a respective region included in a plurality of regions of the process plant or system. The collected data includes data transmitted by a respective plurality of local big data nodes of the respective region, and each local big data node transmits, in real-time, respective data resulting from on-line operations of the respective region of the each local big data node. The method also includes storing the collected data as regional big data at the one or more regional big data nodes. Further, the method includes performing, by the one or more regional big data nodes, one or more learning analyses on at least a portion of the regional big data, and generating learned knowledge based on results of the one or more learning analyses. Additionally, the method includes causing a change in operations of at least a portion of the process plant or process control system based on the results of the one or more learning analysis including transmitting the learned knowledge to a recipient big data node corresponding to the at least the portion of the process plant system.

An embodiment of a system for supporting regional big data in a process plant or process control system includes one or more regional big data nodes, a plurality of local big data nodes, and a communications network communicatively connecting the one or more regional big data nodes and the plurality of local big data nodes. The plurality of local big data nodes being arranged into a plurality of regions, each of which is serviced by a respective regional big data node included in the one or more regional big data nodes. The respective regional big data node is configured to collect data generated in real-time by a set of local big data nodes associated with the respective region serviced by the respective regional big data node, where the data is generated in real-time by the set of local big data nodes due to real-time control of a process in the process plant or process control system. The respective regional big data node is also configured to store the collected data as respective regional big data at a big data storage area included in the respective regional big data node. Further, the respective regional big data node is configured to perform, using a big data analyzer included in the respective regional big data node, a learning analysis on at least a portion of the stored respective regional big data, and to generate learned knowledge based on the result of the performed learning analysis. Still further, the regional big data node is configured to at least one of (i) store, at the big data storage area, the learned knowledge as additional respective regional big data, or (ii) transmit the learned knowledge to a recipient big data node included in the process plant or process control system.

Knowledge discovery and big data techniques within a process control plant, system, or environment are inherently different than traditional big data techniques. Typically, traditional big data applications are singularly transactional, end-user directed, and do not have strict time requirements or dependencies. For example, a web retailer collects big data pertaining to browsed products, purchased products, and customer profiles, and uses this collected data to tailor advertising and up-sell suggestions for individual customers as they navigate the retailer's web site. If a particular retail transaction (e.g., a particular data point) is inadvertently omitted from the retailer's big data analysis, the effect of its omission may be in most cases negligible, especially when the number of analyzed data points is very large. In the worst case, an advertisement or up-sell suggestion may not be as closely tailored to a particular customer as could have been if the omitted data point had been included in the retailer's big data analysis.

In process plants and process control environments, though, the dimension of time and the presence or omission of particular data points is critical. For example, if a particular data value is not delivered to a recipient component of the process plant within a certain time interval, a process may become uncontrolled, which may result in a fire, explosion, loss of equipment, and/or loss of human life. Furthermore, multiple and/or complex time-based relationships between different components, entities, and/or processes operating within the process plant and/or external to the process plant may affect operating efficiency, product quality, and/or plant safety. The knowledge discovery provided by the process control system big data techniques described herein may allow such time-based relationships to be discovered and utilized, thus enabling a more efficient and safe process plant that may produce a higher quality product.

A key feature of the process control regional big data techniques described herein is scalability. Although much publicity has been made by describing massive computing platforms capable of spreading computing across hundreds of servers, there has been a lack of focus on smaller more realistic problems. There are many reasons for considering smaller, closer-to-the-source big data systems including ease of use (e.g., simpler to install, train, and maintain), cost (e.g., of computing, storage, and bandwidth resources), and availability of experts. Accordingly, a smaller system with the ability for added-on configurable modules will be easy to understand, engineer, and support by existing staff. By contrast, a large cluster of computers or a massive cloud-based system requires significant expertise and computing resources that may not available to all parties (e.g., other computing systems, users, devices, etc.) all the time. Another key feature of the process control regional big data techniques described herein is that the techniques can be implemented independently without disruptions to existing process control plants or systems (e.g., control systems, asset management systems, machine health systems, etc.) that may be critical to the operation of a plant, organization or company. For example, regional big data techniques may be applied to only critical portions of a process plant or only to add-on, new sections of a process plant. In another example, regional big data techniques may be overlaid over desired portions of a process plant.

DETAILED DESCRIPTION

Figure 1:
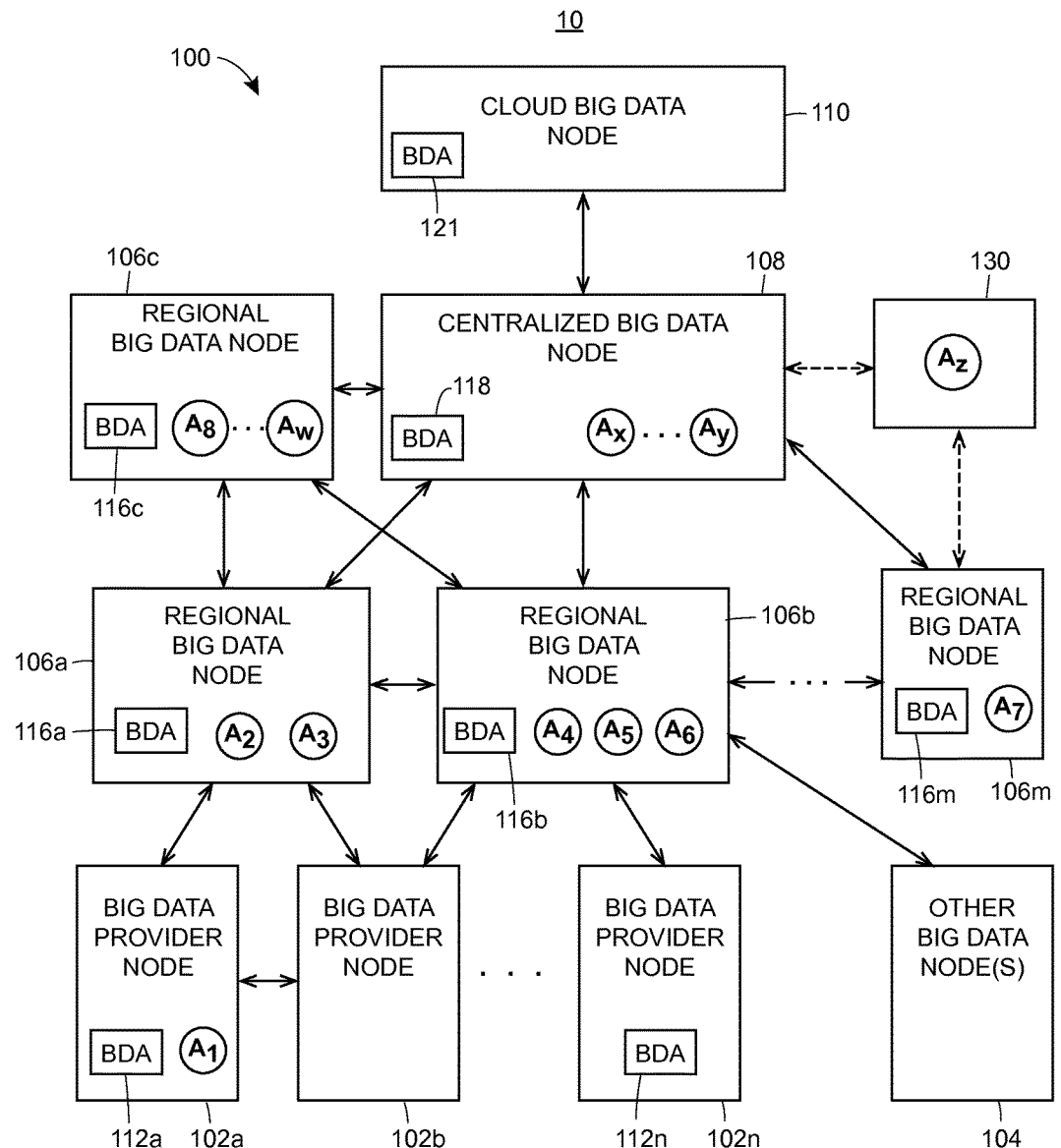
FIG. 1 is a block diagram of an example big data network for a process plant or process control system that supports regional big data.

FIG. 1 is a simplified block diagram of an example big data network 100 for a process plant or process control system 10 that controls one or more processes and that supports process control big data, and in particular, supports regional process control big data. The process control big data network 100 includes one or more process control big data nodes 102-110, each of which collects, observes, generates, stores, analyzes, accesses, transmits, receives, and/or operates on process control big data. The terms "process control big data," "process big data," and "big data," as used interchangeably herein, generally refer to all (or almost all) data that is generated, received, and/or observed by devices included in and associated with the process control system or plant 10. In an embodiment, all data that is generated by, created by, received at, or otherwise observed by all devices included in and associated with the process plant 10 is collected and stored as big data within the process control big data network 100.

The example process control big data network 100 includes one or more different types of process control big data nodes or devices 102-110, each of which collects, observes, generates, stores, analyzes, accesses, transmits, receives, and/or operates on process control big data generated from or based on the control of the one or more processes by the process plant or process control system 10. Each process control big data node or device 102-110 is connected to a process control system big data network backbone (not shown), and may use the backbone to communicate with one or more other process control big data nodes. Accordingly, the process control big data network 100 comprises the process control system big data network backbone and the process control big data nodes 102-110 that are communicatively connected thereto. In an example, the process control big data network 100 includes a plurality of networked computing devices or switches that are configured to route packets to/from various other devices, switches or nodes of the network 100 via the backbone.

The process control big data network backbone comprises any number of wired communication links and any number of wireless communication links that support one or more suitable routing protocols, e.g., protocols included in the Internet Protocol (IP) suite (e.g., UPD (User Datagram Protocol), TCP (Transmission Control Protocol), Ethernet, etc.), or other suitable routing protocols. In an embodiment, the backbone supports a streaming protocol such as the Stream Control Transmission Protocol (SCTP) and/or another suitable streaming protocol to stream (e.g., transport) data between process control big data nodes. For example, aforementioned U.S. application Ser. No. 14/506, 863 entitled "STREAMING DATA FOR ANALYTICS IN PROCESS CONTROL SYSTEMS" describes examples of streaming protocols and techniques for process control big data, any one or more of which may be utilized by the process control big data network backbone in the network 100. Typically, each node included in the process data big data network 100 may support at least an application layer (and, for some nodes, additional layers) of the routing protocol(s) supported by the backbone. In an embodiment, each process control big data node 102-110 is uniquely identified within the process control system big data network 100, e.g., by a unique network address.

In an embodiment, at least a portion of the process control system big data network 100 is an ad-hoc network. As such, at least some of the nodes 102-110 (and/or one or more other nodes, such as a user interface device 130) may connect to the network backbone (or to another node of the network 100) in an ad-hoc manner.

As FIG. 1 is a simplified diagram that depicts communicative connections between various big data nodes 102-110 in the process control big data network 100, the process control network backbone is not explicitly shown in FIG. 1. However, an example of such a backbone which may be utilized with any or all of the techniques described herein is described in U.S. patent application Ser. No. 13/784,041, entitled "BIG DATA IN PROCESS CONTROL SYSTEMS" and filed Mar. 3, 2013, the entire disclosure of which is incorporated by reference herein. Of course, any or all of the techniques described herein are not limited to being utilized with the backbone described in U.S. patent application Ser. No. 13/784,041, but may be utilized with any suitable communication network backbone.

Turning now to the different types of process control big data nodes or devices 102-110, generally, a process control big data node of the network 100 may be a "big data provider" and/or may include a "big data appliance," as is discussed below.

The terms "big data provider," "big data provider node," or "provider node," as used interchangeably herein, generally refer to a process control big data node that collects, generates, observes, and/or forwards process control related big data using the process control big data network 100. The process control big data that is generated, collected, observed, and/or forwarded by provider nodes may include data that has been directly utilized in or generated from controlling a process within the plant 10, e.g., first-order real-time and configuration data that is generated or used by process control devices such as controllers, input/output (I/O) devices, and field devices. Additionally or alternatively, process control big data provider nodes may generate, collect, observe, and/or forward data related to delivering and routing such first-order process control data and other data within the process plant 10, e.g., data related to network control of the big data network 100 and/or of other communication networks in the plant 10, data indicative of bandwidth, network access attempts, diagnostic data, etc. Further, some process control big data provider nodes may generate, collect, observe, and/or forward data indicative of results, learning, and/or information that has been learned within the process control big data network 100 by analyzing process control big data that it has collected. Typically, such analytics results, learning, and/or learned information are generated from automatic, autonomous analytics performed by one or more process control big data nodes.

In most cases, a big data provider node includes multi-core hardware (e.g., multi-core processors) for transmitting and receiving big data in real-time (e.g., streamed) and, in some embodiments, for caching the real-time big data in preparation for streaming or other delivery over the process control big data network 100. A big data provider node may, in some embodiments, also include high-density memory for the caching of the real-time big data. Examples of real-time data that may be transmitted, received, streamed, cached, collected, and/or otherwise observed by big data provider nodes may include process control data such as measurement data, configuration data, batch data, event data, and/or continuous data. For instance, real-time data corresponding to configurations, batch recipes, setpoints, outputs, rates, control actions, diagnostics, alarms, events and/or changes thereto may be collected. Other examples of real-time data may include process models, statistics, status data, and network and plant management data. In some embodiments, a big data provider node does not cache at least some of the real-time big data that it observes, but instead streams the un-cached data to one or more other big data nodes as the data is observed, received, or generated. Examples of big data provider nodes which may be utilized with any or all of the techniques described herein may be found in aforementioned U.S. patent application Ser. No. 13/784,041; in U.S. patent application Ser. No. 14/174,413 entitled "COLLECTING AND DELIVERING DATA TO A BIG DATA MACHINE IN A PROCESS CONTROL SYSTEM" and filed Feb. 6, 2014; and in U.S. patent application Ser. No. 14/212,493 entitled "DISTRIBUTED BIG DATA IN A PROCESS CONTROL SYSTEM" and filed Mar. 14, 2014, the entire disclosures of which are hereby incorporated by reference. Of course, any or all of the techniques described herein may be alternatively or additionally utilized with big data provider nodes other than those described in U.S. application Ser. Nos. 13/784,041, 14/174,413, and 14/212,493.

On the other hand, the terms "big data appliance," "big data appliance node," or "appliance node," as used interchangeably herein, generally refer to a process control big data node that receives, stores, retrieves, and analyzes process control big data. As such, a process control big data appliance (or "BDA") generally operates on big data that has been generated or provided by one or more process control big data provider nodes. In general, a BDA supports large scale data mining and data analytics on multi-dimensional data including real-time continuous values, event collection, batch data collection, operator rounds data, and/or other data. Data that is collected and time-stamped at the source may be transferred or streamed to the BDA using a specialized history object communications protocol, such as described in the aforementioned U.S. application Ser. No. 14/506,863 entitled "STREAMING DATA FOR ANALYTICS IN PROCESS CONTROL SYSTEMS," or another suitable communications protocol. The BDA may include various tools that operate on structured as well as unstructured data (e.g., R scripts, Python scripts, Matlab® scripts, Statgraphics, etc.), and perform learning algorithms (e.g., partial least square regression, principle component analysis, etc.), classification techniques (e.g., random forest, pattern recognition, etc.), and/or other data analytics in order to generate useful information such as predicting product capabilities, qualities, and/or other desired characteristics. Further, some BDAs may include interfaces for configuration and developing models, run-time engines for executing models, and dashboards for displaying results at a user interface. For example, a BDA may be configured with analytics for run-time in a manner such as discussed in aforementioned U.S. application Ser. No. 62/060,408, entitled "DATA PIPELINE FOR PROCESS CONTROL SYSTEM ANALYTICS." Displayed results may include standard descriptive statistics, histograms, correlation plots, and/or other data representations that can identify implicit relationships within the various data sets.

In some cases, a big data appliance is included in a big data provider node, or is co-resident with a big data provider within a same node or device. In such cases, the big data appliance is referred to as an "embedded big data appliance," as the appliance is embedded in the provider node or device and operates on the big data that has been received, collected, or generated by the co-resident big data provider. In an example, an embedded big data appliance analyzes big data that has been locally generated and/or provided by the big data provider node on which the embedded big data appliance resides to discover or learn knowledge. This learned knowledge may be stored at the embedded big data appliance, operated on locally by the embedded big data appliance, and/or provided or transmitted as big data to other big data nodes, e.g., recipient big data nodes. Descriptions of embedded big data appliances which may be utilized with any or all of the techniques described herein may be found, for example, in aforementioned U.S. patent application Ser. No. 14/212,493, although other suitable embedded big data appliances may be utilized with any or all of the techniques described herein. Further, it is noted that in embodiments in which a big data provider node includes an embedded big data appliance, the cache of the big data provider node may be reduced in size or omitted, as the embedded big data appliance provides local data storage capabilities.

In some cases, a big data appliance may be a stand-alone big data node of the process control big data network 100. That is, in these cases, a big data appliance is not embedded in or co-resident with a big data provider node. Thus, a process control big data node that includes a big data appliance may not necessarily itself be a provider of big data.

Figure 2:
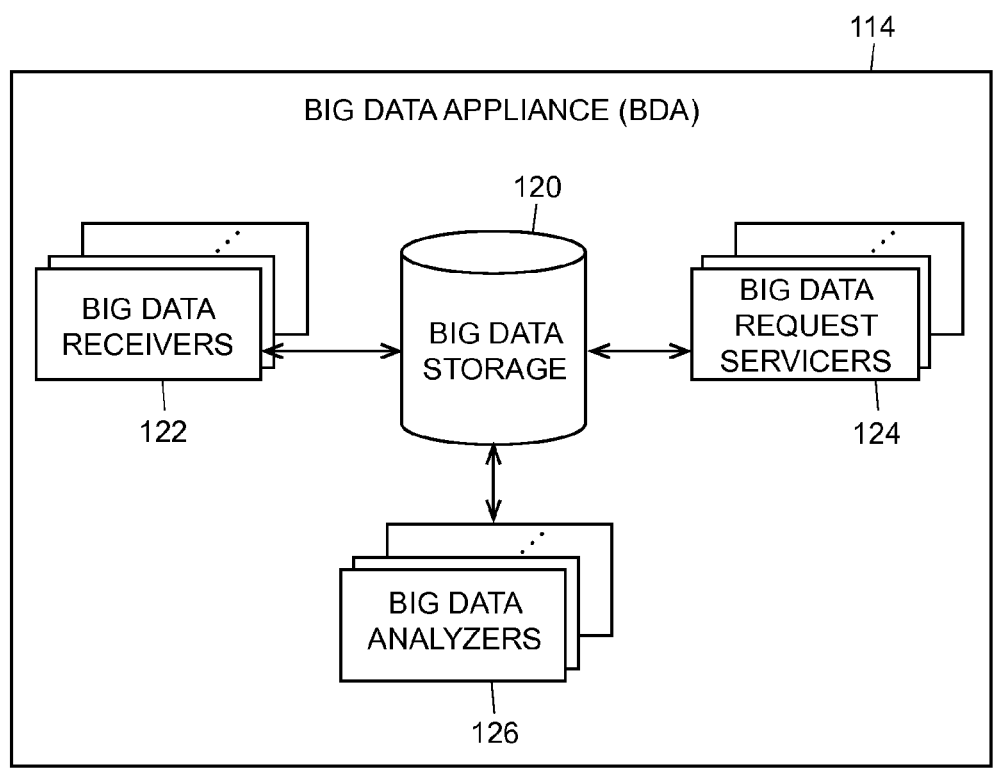
FIG. 2 is a block diagram of an example big data appliance that may be included in the process control big data network of FIG. 1.

FIG. 2 provides a simplified block diagram of an example big data appliance 114, instances of which may be included in the process control big data network 100 of FIG. 1. Referring to FIG. 2, the example big data appliance 114 includes a big data storage area 120 for historizing or storing received big data, one or more big data appliance receivers 122, and one or more big data appliance request servicers 124. Each of the big data appliance receivers 122 is configured to receive, via one or more network interfaces (e.g., to a process control big data network), big data packets (which may be streamed from another node and/or may be generated by a big data provider node on which the appliance 114 resides), process the data packets to retrieve the substantive data and timestamp carried therein, and store the substantive data and timestamp in the big data storage area 120 of the appliance 114, e.g., as time-series data and optionally also as metadata. The big data storage area 120 may comprise multiple local and/or remote physical data drives or storage entities, such as RAID (Redundant Array of Independent Disks) storage, solid-state storage, cloud storage, high-density data storage, and/or any other suitable data storage technology that is suitable for data bank or data center storage, and that has the appearance of a single or unitary logical data storage area or entity to other nodes. Further, each of the big data appliance request servicers 124 is configured to access time-series data and/or metadata stored in the big data appliance storage area 120, e.g., per the request of a requesting entity or application.

In some instances, a big data appliance 114 includes one or more big data analyzers 126 to perform respective data analytics and/or learning on at least parts of the stored big data, typically in an automatic and/or autonomous manner without using any user input to initiate and/or perform the learning analysis. For example, the data analytics and/or learning may be performed in a manner such as previously discussed, in a manner such as discussed in aforementioned U.S. application Ser. No. 62/060,408, entitled "DATA PIPELINE FOR PROCESS CONTROL SYSTEM ANALYTICS," or in some other suitable manner. In an embodiment, the big data analyzers 126 individually or collectively perform large scale data analysis on the stored data (e.g., data mining, data discovery, etc.) to discover, detect, or learn new information or knowledge. For example, data mining generally involves the process of examining large quantities of data to extract new or previously unknown interesting data or patterns such as unusual records or multiple groups of data records. The big data analyzers 126 may also perform large scale data analysis on the stored data (e.g., machine learning analysis, data modeling, pattern recognition, predictive analysis, correlation analysis, etc.) to predict, calculate, or identify implicit relationships or inferences within the stored data. In an embodiment, multiple big data analyzers 126 (and/or multiple instances of at least one big data analyzer 126) may operate in parallel and/or cooperatively to analyze the data stored in the big data storage area 120 of the appliance 114. Further, the multiple big data analyzers 126 may share, exchange, or transfer computed parameters and model information between one another as a type of cooperative data analytics and learning. The multiple big data analyzers 126 may be co-resident on a same big data node, or may be resident on different big data nodes. An example of cooperative data analytics which may be utilized with any or all of the techniques described herein is found in aforementioned U.S. application Ser. No. 62/060,408, entitled "DATA PIPELINE FOR PROCESS CONTROL SYSTEM ANALYTICS," although any suitable cooperative data analytics technique or techniques may be utilized with any or all aspects of the present disclosure.

In an embodiment, at least a portion of the big data receivers 122, the big data appliance request servicers 124, and/or the big data analyzers 126 is included or implemented on one or more integrated circuits, semiconductors, chips, or other suitable hardware. For example, a big data analyzer 126 that performs spectral analysis may be implemented by an integrated circuit chip included in a big data node, such as described in aforementioned U.S. application Ser. No. 14/507,252 entitled AUTOMATIC SIGNAL PROCESSING-BASED LEARNING IN A PROCESS PLANT." In an embodiment, at least a portion of the big data receivers 122, the big data appliance request servicers 124, and/or the big data analyzers 126 comprises computer-executable instructions stored on a memory and executable by a process running on the big data appliance 114. For example, at least some portions of the big data appliance receivers 122, the big data appliance request servicers 124, and/or the big data appliance analyzers 126 comprise respective computer-executable instructions stored on one or more non-transitory, tangible memories or data storage devices, and are executable by one or more processors to perform one or more their respective big data functions.

In some embodiments, the big data analyzers 126 are not included in a big data appliance 114, but instead are co-resident with the big data appliance 114 on a same big data node and in communicative connection with the big data appliance 114. For example, the big data appliance 114, including the storage area 120, receivers 122 and servicers 124 may be implemented by a first set of computer-executable instructions, and the big data analyzers 126 may be implemented by a semiconductor chip or by a second set of computer-executable instructions, which may or may not be stored on the same non-transitory, tangible memories or data storage devices as the first set of computer-executable instructions. In some embodiments, the big data analyzers 126 are not included in a big data appliance 114 and are not co-resident with the big data appliance 114 on a same big data node, but nonetheless are in communicative connection with the big data appliance 114. Descriptions of various types of example big data appliances and their components which may be utilized with any or all of the techniques described herein may be found in aforementioned U.S. patent application Ser. Nos. 13/784,041, 14/174,413, and 14/212,493, although it is understood that any or all of the techniques described herein may be utilized with other suitable big data appliances.

Returning again to FIG. 1, the process control big data network 100 may include process control big data provider nodes 102-110 that operate at various levels, tiers, or orders with respect to first-order or primary process related data that is directly generated, routed, and/or used by process control devices such as controllers, I/O devices, field devices, etc. At the lowest order, tier, or level, "local" big data provider nodes or devices 102a-102n that operate nearest to the process to collect, generate, observe, and/or forward primary process big data related to the input, operation, and output of process devices and equipment in the process plant 10. As such, "local big data provider nodes or devices" 102a-102n typically are nodes and/or devices that generate, route, and/or receive primary process control data to enable the one or more processes to be controlled in real-time in the process plant 10. Examples of local big data provider nodes 102a-102n include devices whose primary function is directed to generating and/or operating on process control data to control a process, e.g., wired and wireless field devices, controllers, and I/O devices. These process control devices may be communicatively connected to each other and/or to one or more process control communications networks in a distributed manner. For instance, one or more field devices are communicatively connected to one or more I/O devices, which in turn are communicatively connected to one or more controllers, which are in turn communicatively coupled to one or more process control communication networks (e.g., HART®, WirelessHART®, process control big data, FOUNDATION® Fieldbus, etc.).

Other examples of local big data provider nodes 102a-102n include devices whose primary function is to provide access to or routing of primary process data through one or more communications networks of the process control system 10 (which may include the process control big data network 100 and/or other communication networks). Examples of such types of local big data provider nodes 102a-102n include access points, routers, interfaces to wired control busses, gateways to wireless communications networks, gateways to external networks or systems, and other such routing and networking devices. Still other examples of local big data provider nodes 102a-102n include devices, such as historian devices, that are configured to temporarily store big data throughout the process control system 10, e.g., as an overflow cache, way-station, or routing queue.

In some cases, a local big data provider node includes a respective local big data appliance, as illustrated in FIG. 1 by the nodes 102a, 102n that respectively include the embedded big data appliances 112a, 112n. Each local, embedded big data appliance 112a, 112n receives and stores respective local big data provided by its respective provider 102a, 102n. Further, in some local big data provider nodes, such as in the node 102a, one or more analytics functions, routines, operations, or processes (represented by the encircled $A_1$) may be performed on at least some of the local big data stored in the appliance 112a. In an embodiment, the analytics $A_1$ are performed by one or more of the big data analyzers 126 of FIG. 2. The learned information, learnings, and/or the results of the one or more analytics $A_1$ may also be stored in the local big data appliance 112a, and at least some of the learned information or results may be provided to another big data node 106a. For example, a local big data provider node that is included in or coupled to a controller performs a frequency analysis or other signal-processing analysis on the output signal of the controller (such as described in aforementioned U.S. application Ser. No. 14/507,252, entitled "AUTOMATIC SIGNAL PROCESSING-BASED LEARNING IN A PROCESS PLANT"), and the local big data provider node transmits the results of the analysis to another big data node.

Some local provider nodes, e.g., as illustrated by the node 102n, include a respective local, embedded big data appliance 112n for local big data collection and historization, however, the resident appliance 112n performs minimal or no analytics. As such, the node 102n merely streams (or otherwise transmits, e.g., upon request or at suitable times) locally stored big data to another node 106b, e.g. for analytical processing or for further forwarding. Some local big data nodes, e.g., the node 102b, do not include any big data appliance at all. Such nodes 102b may stream, in real-time or with the aid of a cache, locally observed big data to one or more other big data nodes 102a, 106b.

Various types of real-time data, such as process-related data, plant-related data, and other types of data, may be cached, collected, stored, transmitted, and/or streamed as big data by the big data provider nodes or devices 102a-102n. Examples of process-related data include continuous, batch, measurement, and event data that are generated while a process is being controlled in the process plant 10 (and, in some cases, are indicative of an effect of a real-time execution of the process). Further, process-related data may include process definitions, arrangement or set-up data such as configuration data and/or batch recipe data, data corresponding to the configuration, execution and results of process diagnostics, etc.

Plant-related data, such as data related to the process plant 10 but that may not be generated by applications that directly configure, control, or diagnose a process in the process plant 10, may also cached, collected, stored, transmitted, and/or streamed by the big data provider nodes 102a-102n as big data. Examples of plant-related data include vibration data, steam trap data, data indicative of a value of a parameter corresponding to plant safety (e.g., corrosion data, gas detection data, etc.), data indicative of an event corresponding to plant safety, data corresponding to the health of machines, data corresponding to assets in the plant such as plant equipment and/or devices, data corresponding to the configuration, execution and results of equipment, machine, and/or device diagnostics, and data that is useful for diagnostics and prognostics.

Further, other types of data including data highway traffic and network management data related to the process control big data network backbone and of various communications networks of the process plant 10, user-related data such as data related to user traffic, login attempts, queries and instructions, text data (e.g., logs, operating procedures, manuals, etc.), spatial data (e.g., location-based data), and multi-media data (e.g., closed circuit TV, video clips, etc.) may be cached, collected, stored, transmitted, and/or streamed by the big data provider nodes 102a-102n as big data.

In some embodiments, dynamic measurement and control data may be automatically cached, collected, stored, transmitted, and/or streamed by the big data provider nodes 102a-102n as big data. Examples of dynamic measurement and control data include data specifying changes in a process operation, data specifying changes in operating parameters such as setpoints, records of process and hardware alarms and events such as downloads or communication failures, etc. In addition, static data such as controller configurations, batch recipes, alarms and events may be automatically collected by default when a change is detected or when a controller or other entity is initially added to the big data network 100.

Moreover, in some scenarios, at least some static metadata that describes or identifies dynamic control and measurement data is captured in the big data provider nodes 102a-102n when a change in the metadata is detected. For example, if a change is made in the controller configuration that impacts the measurement and control data in modules or units that must be sent by the controller, then an update of the associated metadata is automatically captured by the big data provider nodes 102a-102n. Additionally or alternatively, parameters associated with the special modules used for buffering data from external systems or sources (e.g., weather forecasts, public events, company decisions, etc.), surveillance data, and/or other types of monitoring data may be automatically captured by the big data provider nodes 102a-102n.

In some situations, added parameters created by end users are automatically captured in the big data provider nodes 102a-102n. For example, an end user may create a special calculation in a module or may add a parameter to a unit that needs to be collected, or the end user may want to collect a standard controller diagnostic parameter that is not communicated by default. Parameters that the end user optionally configures may be communicated in the same manner as the default parameters.

Referring again to FIG. 1, at one or more levels or tiers above the local big data nodes 102a-102n, the process control big data network 100 may include one or more regional big data nodes 106a-106m. To implement regional big data, the process plant or process control system 10 may be viewed as having a plurality of different areas or regions which may be delineated according to any desired manner and/or grouping, such as geographical, physical, functional, logical, etc. In an illustrative but non-limiting example, a process plant may have a first region that receives raw materials and produces a first intermediate product, a second region that receives other raw materials and produces a second intermediate product, and a third region that receives the first and second intermediate products to produce an output product. Each of these three different example regions may be serviced by a respective "regional" big data node 106a, 106b, 106m to operate on big data produced by its respective region. Accordingly, a "regional big data node" provides big data support and services for data that is generated and/or provided by a respective grouping or region of local big data provider nodes 102 and, in some cases, by other big data provider nodes 104. Other big data provider nodes 104 may include, for example, big data nodes that are external to the region of the plant 10 (e.g., a portable diagnostics device or an off-line simulator), user interface devices 130, or data sources that are external to the process plant 10 altogether (e.g., a computing device of a materials supplier, a feed providing a weather forecast, etc.).

As shown in FIG. 1, a respective grouping or region serviced by a regional big data node 106a-106m may comprise one or more big data provider nodes 102a-102n and/or other big data nodes 104 that are related according to some or at least one of a geographical, physical, functional, logical, or other desired manner. For example, the regional big data node 106a services a region including the local big data provider nodes 102a and 102b, and the regional big data node 106b services a region including the local big data nodes 102b and 102n, as well as another big data node 104. The particular nodes 102, 104 included in a particular region may stream or deliver data to their respective regional big data node 106 for purposes of regional big data storage, access, and/or analysis. Further, any of the big data provider nodes 102a-102n and/or the other big data nodes 104 may communicate with a particular regional big data node 106a-106m to request regionally available services and/or to access regional big data and metadata stored therein, whether such requesting nodes are included in the particular region of the particular regional big data node 106a-106m or not.

Accordingly, each regional big data node 106a-106m includes a respective regional big data appliance 116a-116m via which big data is received, stored as regional big data, and accessed or requested. Further, each regional big data node 106a-106m typically includes one or more analytics functions, routines, operations, or processes (e.g., $A_2$-$A_w$) that may individually and/or cooperatively operate on at least some of the regional big data. For example, the regional big data appliance 116b may receive local big data from local provider nodes 102*b*, 102*n* that are configured to cooperatively control the flow of a liquid through a portion or region of the process plant 10, and the node 106*b* may perform an analytics process $A_4$ on at least some of the received data to determine an average transport delay of the liquid within the portion or region of the process plant. The results of the analytics $A_4$ may then be stored or historized as additional regional big data within the regional big data appliance 116*b*. In an embodiment, each of the analytics $A_2$-$A_w$ are performed by one or more big data analyzers 126 of FIG. 2 that are resident on the respective big data node.

In some situations, the regional big data nodes or devices 106*a*-106*m* communicate received or generated big data, learned knowledge or information, and/or analytics results with another regional big data node 106*a*-106*m*, e.g., as peers. To illustrate by continuing with the above example, the regional big data node 116*a* receives learned information that has been generated by the analytics analysis $A_4$ performed by the regional big data node 106*b*. Subsequently, the regional big data node 106*a* may then perform one or more respective regional analytics $A_2$, $A_3$ on at least part of the peer-provided learned information from the node 106*b* in conjunction with the local big data received from the local big data nodes 102*a*, 102*b* within its own region. The analytics $A_2$, $A_3$ may, in turn, generate additional regional big data for historization at the regional big data appliance 116*a* and/or for provision to other big data nodes 106*b*, 106*c*, 108. As such, as a regional big data node 106*a*-106*m* may originate regional big data in some scenarios (e.g., based on the results or learning of any resident analytics that were performed thereby), a regional big data node 106*a*-106*m* may also operate as a regional big data provider node.

Grouping of the big data provider nodes 102*a*-102*n* under respective regional big data nodes may be carried out according to any desired manner such as geographical, physical, functional, logical, etc. For example, in an illustrative but non-limiting scenario, a process in the process plant 10 may produce a particular product based on two intermediate products. As such, the local big data provider node 102*a* may represent a first control loop that produces the first intermediate product, and the local big data provider node 102*b* may represent a second control loop that produces the second intermediate product. Thus, all process control data that is generated, collected, received or otherwise observed by the two control loops 102*a*, 102*b* may be transmitted to the regional big data node 106*a* for historization, storage and analysis.

In a similar manner, the regional big data node 106*b* may receive and analyze data from its respective group of big data provider nodes. For example, the regional big data node 106*b* may be responsible for analyzing the big data corresponding to the production of another product that is based on intermediate products from each of the big data provider nodes 102*b*, 102*n* in conjunction with big data provided by other sources 104.

At the regional big data node 106*a*, the received big data may be analyzed (e.g., by using one or more analytics functions or processes $A_2$, $A_3$) to create or generate learned knowledge that describe meaningful relationships, patterns, correlations, trends, etc., across time and/or across at least some of the various data sets. For example, a certain combination of events in the two control loops 102*a*, 102*b* may lead to poor product quality when the particular product is eventually produced. To determine the root causes of the poor product quality, the regional big data node 106*a* analyzes data generated by the combination of events at or shortly after their occurrence (e.g., when the data corresponding to the events' occurrences is received at the regional big data node 106*a*). The regional big data node 106*a* may generate learned knowledge that predicts the poor product quality based on the occurrence of these events, and/or may automatically adjust or change one or more parameters in real-time to mitigate the effects of the combination of events if and when they occur in the future. For instance, the regional big data node 106*a* may determine a revised setpoint or revised parameter values to better regulate and manage the two control loops 102*a*, 102*b*.

Generally, each regional big data node 106*a*-106*m* (or its respective big data appliance 116*a*-116*m*) analyzes data from its respective group or region of big data provider nodes to determine meaningful patterns, correlations, trends, etc. The learned patterns, correlations, trends, etc. is then stored in the respective regional big data appliances 116*a*-116*m* as learned knowledge. As used herein, the term "learned knowledge" or "learnings" generally refers to data, services, functions, routines, and/or applications that are generated as a result of one or more analyses being performed on big data. Further, each regional big data node 106*a*-106*m* (or its respective big data appliance 116*a*-116*m*) may determine or define a new service, function, routine, or application (and/or modify an existing service, function, routine, or application) based on the initially learned knowledge, which, in turn, is stored as further learned knowledge.

Regional big data nodes 106*a*-106*m* may be utilized for layered or leveled learning. For example, one or more regional big data nodes may transmit their learned knowledge and/or stored data to an upstream big data node that oversees or services multiple regions. As shown in FIG. 1, a regional big data node 106*c* receives learned knowledge and/or data from the regional big data nodes 106*a* and 106*b*, and the node 106*c* historizes the received big data in its respective embedded appliance 116*c*. The regional big data node 106*c* may perform further analysis or learning on at least some of the received learned knowledge and/or data (e.g., by using one or more of the analytics functions $A_8$-$A_w$) to generate additional learned knowledge (e.g., data patterns, trends, correlations, etc., services, functions, routines, and/or applications), which may be, in turn, stored as additional regional big data within the embedded appliance 116*c* and/or provided to other big data nodes 106*a*, 106*b*, 108.

In an embodiment, layered or leveled learning is carried out on a bottom-up basis. In an illustrative but non-limiting example, a regional big data node 106*a* analyzes data received from its respective group of local big data provider nodes 102*a*, 102*b* to determine if its "region" is operating correctly. Knowledge that the regional big data node 106*a* learns from its analysis may result in the regional big data node 106*a* generating a new diagnostic routine (e.g., a learned routine). The regional big data node 106*a* may transmit the generated diagnostic routine to an upstream big data node 106*c* for storage, usage, and/or access. The regional big data node 106*a* may independently initiate the sharing of the new diagnostic routine with the upstream regional big data node 106*c* (e.g., automatically as generated or on a periodic basis), or the regional big data node 106*a* may cause the new diagnostic routine to be transmitted when the upstream regional big data node 106*c* requests the regional big data node 106*a* to share one or more types of new learned knowledge.

In an embodiment, layered or leveled learning is carried out on a top-down basis. To illustrate by continuing with the above example, the upstream regional big data node 106*c* may analyze the received diagnostic routine and determine that the diagnostic routine is useful or applicable to other regional big data nodes (e.g., the regional big data node 106b). Accordingly, the upstream regional big data node 106c may distribute the diagnostic routine to the regional big data node 106b so that the regional big data node 106b and/or any of the local provider nodes 102a, 102n, 104 in its region is able to utilize the diagnostic routine for its respective diagnostic purposes. The upstream regional big data node 106c may independently initiate the sharing of the new diagnostic routine with the regional big data node 106b, or the upstream regional big data node 106c may cause the new diagnostic routine to be transmitted upon a request made by the regional big data node 106b. Alternatively or additionally, the upstream regional big data node 106c may generate a general diagnostic routine by aggregating and analyzing learned knowledge received from all regional big data nodes that it is overseeing, servicing, and/or connected to. In this scenario, the upstream regional big data node 106c distributes the general diagnostic routine to any or all of its regional big data nodes, e.g., automatically as generated or on a periodic basis, upon request of a particular regional big data node, when the upstream regional big data node 106c receives data from a regional big data node that indicates the general diagnostic may be of use, or for some other reason. Subsequently, and in a similar manner, each regional big data node downstream of the regional big data node 106c may distribute the general diagnostic routine to any number of the local big data providers in its respective region.

In some embodiments, regional big data nodes, e.g., the nodes 106a and 106b, may share learned knowledge with each other, e.g., in a peer-to-peer manner. For example, the regional big data node 106a transmits a new or learned analytics routine directly to the regional big data node 106b so that the regional big data node 106b may utilize the new analytics routine for its own purposes.

It is noted that in FIG. 1, only one upstream regional big data node 106c is depicted. However, the techniques and concepts discussed with respect to FIG. 1 may be applied to any number of upstream regional big data nodes supporting multiple layers or levels of big data historization, storage and learning.

Further, as both regional big data appliances and localized big data appliances service different respective big data nodes and/or different respective groups or regions of the process plant 10, but do not service the entire process plant 10 or more than one region thereof, both regional big data appliances and localized big data appliances are generally and categorically referred to herein as "distributed big data appliances." Generally, distributed big data appliances communicate big data with multiple other big data appliances. For example, a local big data appliance included in a particular big data provider node may communicate learned knowledge and/or big data to other localized big data appliances included in other big data provider nodes, to one or more regional big data appliances, and/or to a centralized big data appliance (which is described in more detail below). Similarly, a regional big data appliance may receive big data from one or more localized big data appliances and/or big data provider nodes. The regional big data appliance may communicate learned knowledge and/or big data to other regional big data appliances, and/or to a centralized big data appliance.

As mentioned above, in some configurations of the process control big data network 100, at least some of the regional big data nodes or devices 106a-106m, local big data nodes or devices 102a-102n, and/or other big data nodes or devices 104 communicate respective big data, analytics results, and/or learned information to a centralized big data node 108. A "centralized big data node," as referred to herein, typically services multiple regions of the process plant 10, and in some situations, services a majority or an entirety of the process plant 10. As such, the centralized big data node 108 includes one or more centralized, embedded big data appliances 118 to receive, store, and provide access to process plant big data. For example, the centralized big data appliance 118 may provide comprehensive, long-term historization of most or all of the big data generated by the process plant 10, and/or the centralized big data appliance 118 may publish big data for process plant-wide availability to other big data nodes, or even to computing devices within or external to the process plant that are not process control big data nodes.

In some configurations, a single centralized big data node 108 or appliance 118 may not service an entire process control system or plant 10, but may service more than one region of the process control system or plant 10. For example, different centralized big data nodes 108 or appliances 118 may be used within a single plant or system 10 to partition different types or areas of big data for security and access purposes. In some configurations, a single centralized big data node 108 or appliance 118 services the entire process plant 10.

In the process plant 10, one or more of the regional big data nodes 106a-106m may cause some or all of its generated or received learned knowledge and/or data to be streamed or otherwise delivered to the centralized big data node 108. For example, one or more of the regional big data nodes 106a-106m transmits at least some of its respectively stored learned knowledge and/or data to the centralized big data node 108. In some embodiments, one or more of the regional big data nodes 106a-106m pushes at least some of its respectively stored learned knowledge and/or data to the centralized big data node 108 at periodic intervals. In some embodiments, one or more of the regional big data nodes 106a-106m provides at least a portion of its respectively stored learned knowledge and/or data in response to a request from the centralized big data node 108.

The centralized big data node 108 and/or its embedded appliance 118 may be configured to further analyze any or all of the received learned knowledge and/or data received from the regional big data nodes 106a-106m, e.g., by utilizing one or more analytics functions $A_x$-$A_y$. In an embodiment, each of the analytics $A_x$-$A_y$ are performed by one or more big data analyzers 126 of FIG. 2 that are resident on the respective big data node. The one or more analytics functions $A_x$-$A_y$ may operate on the received learned knowledge and/or data to generate additional knowledge and determine relationships between various entities and providers internal and external to the process plant 10. The additional knowledge and determined relationships may be stored and otherwise utilized as additional centralized big data at the embedded appliance 118, for example. In some cases, the centralized big data node 108 or appliance 118 utilizes the generated knowledge and relationships to control one or more processes of the plant 10 accordingly.

Indeed, any node 102-106 of the big data network 100 may stream or otherwise provide big data to a centralized big data appliance 118, e.g., for historization or long-term storage. For example, a local big data provider node 102 may stream its big data directly to the centralized big data node 108. Similarly, any node 102-106 of the big data network may request services provided by the embedded centralized appliance 118, and/or may request access to data and metadata stored therein. Further, in embodiments in which multiple centralized big data nodes 108 or appliances 118 service a single process plant 10, the multiple centralized big data nodes 108 or appliances 118 may communicate in a peer-to-peer manner, similar to that described for the regional big data nodes 106a-106m.

Also similar to the regional big data node 106a-106m, a centralized big data node 108 may itself be a producer or provider of big data in some situations, such as when analytics performed by the centralized big data node 108 (e.g., one or more the analytics functions $A_x$-$A_y$) result in additional discovered or learned information that is stored at the centralized big data appliance 118 and made accessible to other big data nodes 102-106. However, typically, the majority of the volume of big data handled and serviced by a centralized big data appliance 118 is received from other big data nodes 102-106. A description of an example centralized big data node 108 and an example centralized big data appliance 118 which may be utilized with any or all of the techniques described herein may be found in aforementioned U.S. patent application Ser. No. 13/784,041. However, any or all of the techniques described herein may be alternatively or additionally utilized with centralized big data appliances other than those described in U.S. patent application Ser. No. 13/784,041.

In some configurations, a centralized big data node 108 communicates data and learned information to a remote big data node (e.g., a big data node that is remote with respect to the process plant 10) for big data historization, storage, access, and/or analysis. Such a big data node, referred to herein as a "cloud big data node 110," may provide services to multiple different process plants or process control systems 10. For example, a company that operates multiple different oil refineries may provide a cloud big data node 110 and a cloud big data appliance 121 to service big data related to all of its oil refineries. For instance, via the cloud big data node 110 and the resident cloud big data appliance 121, a centralized big data node of a particular refinery may obtain published big data of the process plant 10, and may utilize the obtained, published big data for plant operations at the particular refinery. In some embodiments, any of the big data nodes 102-106 may directly stream or provide data to the cloud big data node 110. Similarly, any of the big data nodes 102-106 may request services provided by the embedded appliance 121 of the cloud big data node 110, and/or access data and metadata stored therein. Although not shown in FIG. 1, a cloud big data node 110 may include one or more respective analytics routines, functions, or processes therein, e.g., as may be provided by big data analyzers 126 of FIG. 2.

Further, it is noted that not all types of big data nodes are included in all process plants. For example, a highest level of big data processing at a particular process plant may be at the regional level, and as such the particular process plant may not include any centralized big data nodes 108, and may not be connected to a cloud big data node 110. Generally, though, to facilitate or support regional big data, a process plant 10 includes at least one local big data provider node 102 and at least one regional big data node 106.

In an embodiment, at least some of the regional big data nodes 106 may be overlaid with respect to the local big data provider nodes 102. For example, various local big data provider nodes 102 may comprise devices or nodes of an existing control system, e.g., process control devices (e.g., field devices, controllers, I/O devices), gateway devices, access points, routing device or routers, historian devices, network management devices, etc. To implement regional big data, one or more regional big data nodes 106 may be added to or overlaid on top of the existing control system so that analytics may be performed and big data may be transferred between regional big data nodes of the big data network in a manner independent of the operations of the existing control system.

Additionally, in some embodiments, a process plant 10 includes one or more legacy process control devices (not shown) that do not inherently include any big data support. In these embodiments, a gateway node in the plant 10 or an adjunct device directly coupled to a legacy device may convert or translate data messages between a protocol utilized by the legacy device and the protocol utilized by the process control big data network backbone, thereby communicatively connecting the legacy device and the process control big data network 100. Examples of legacy devices being used with a process control big data network are discussed in aforementioned U.S. application Ser. No. 14/506,863, entitled "STREAMING DATA FOR ANALYTICS IN PROCESS CONTROL SYSTEMS."

Moreover, typically, big data nodes or devices 102-110 do not have an integral user interface, although some of the big data nodes or devices 102-110 may have the capability to be in communicative connection with one or more user interface devices 130, e.g., by communicating over a wired or wireless communication link, or by plugging a user interface device 130 into a port of the big data nodes or devices 102-110. In FIG. 1, the user interface device 130 is depicted a big data node that is wirelessly connected to the process control big data network 100.

The user interface device or user interface big data node 130 is a device having one or more integrated user interfaces (e.g., a mobile or stationary computing device, a workstation, a handheld device, a surface computing device, a tablet, etc.) via which a user or operator may interact with the process control system or process plant 10 to perform activities related to the process plant 10 (e.g., configure, view, monitor, test, diagnose, order, plan, schedule, annotate, and/or other activities). Integrated user interfaces may include a screen, a keyboard, keypad, mouse, buttons, touch screen, touch pad, biometric interface, speakers and microphones, cameras, and/or any other user interface technology. The user interface devices 130 may include a direct wired and/or wireless connection to the process control system big data network backbone, or may include an indirect connection to the backbone, e.g., via an access point or a gateway.

In some embodiments, a user interface device 130 may have one or more built-in analytic capabilities or routines (denoted in FIG. 1 by the encircled $A_z$). In other words, a user interface device 130 may communicate with any number of big data nodes and/or big data appliances to download data and perform local analysis $A_z$ on the downloaded data and/or on additional data known to the user interface device 130 to discover or learn knowledge. Indeed, in some configurations, a user interface device 130 is a big data provider node, and may itself provide at least some of the results of its analysis $A_z$ and/or knowledge that is learned from the analysis results as big data to one or more other local, regional, centralized, cloud, or other big data nodes 102-110. Examples of the usage of user interface devices in process control big data networks (which may be utilized with any or all of the techniques described herein) may be found, for example, in U.S. patent application Ser. No. 14/028,785, entitled "METHOD AND APPARATUS FOR CONTROLLING A PROCESS PLANT WITH LOCATION AWARE MOBILE CONTROL DEVICES" and filed on Sep. 17, 2013, the entire disclosure of which is hereby incorporated by reference. Of course, however, other techniques of utilizing user interface devices with process control big data network 100 may be alternatively or additionally employed with any or all of the techniques described herein.

In an embodiment, the user interface device 130 is a wireless or handheld device with special chipsets and/or computer-executable instructions that are capable of running analytical applications or applets. As such, the user interface device 130 may download or request data from any of the local, regional, centralized, or cloud big data nodes 102-110, and then execute the applets to perform specialized processing on any or all of the downloaded data and/or, in some cases, on other data known to the user interface device 130. The user interface device 130 may automatically execute the applets once data has finished downloading, or the user interface device 130 may execute the applets based on a user input or command received via a user interface that is part of the device 130. Results or analytics generated from the applets may be transmitted from the user interface device 130 to one or more big data nodes of the process control big data network, e.g., as learned knowledge. Said learned knowledge generated by the user interface device 130 may provide useful information to the various big data nodes 102-110 in the form of feedback, diagnostics, troubleshooting, on-line predictions, fault detections, recommendations, etc. For instance, analytical applets of this nature may be developed to evaluate or analyze specific equipment, devices, processes, plants, companies, etc.

Figure 3:
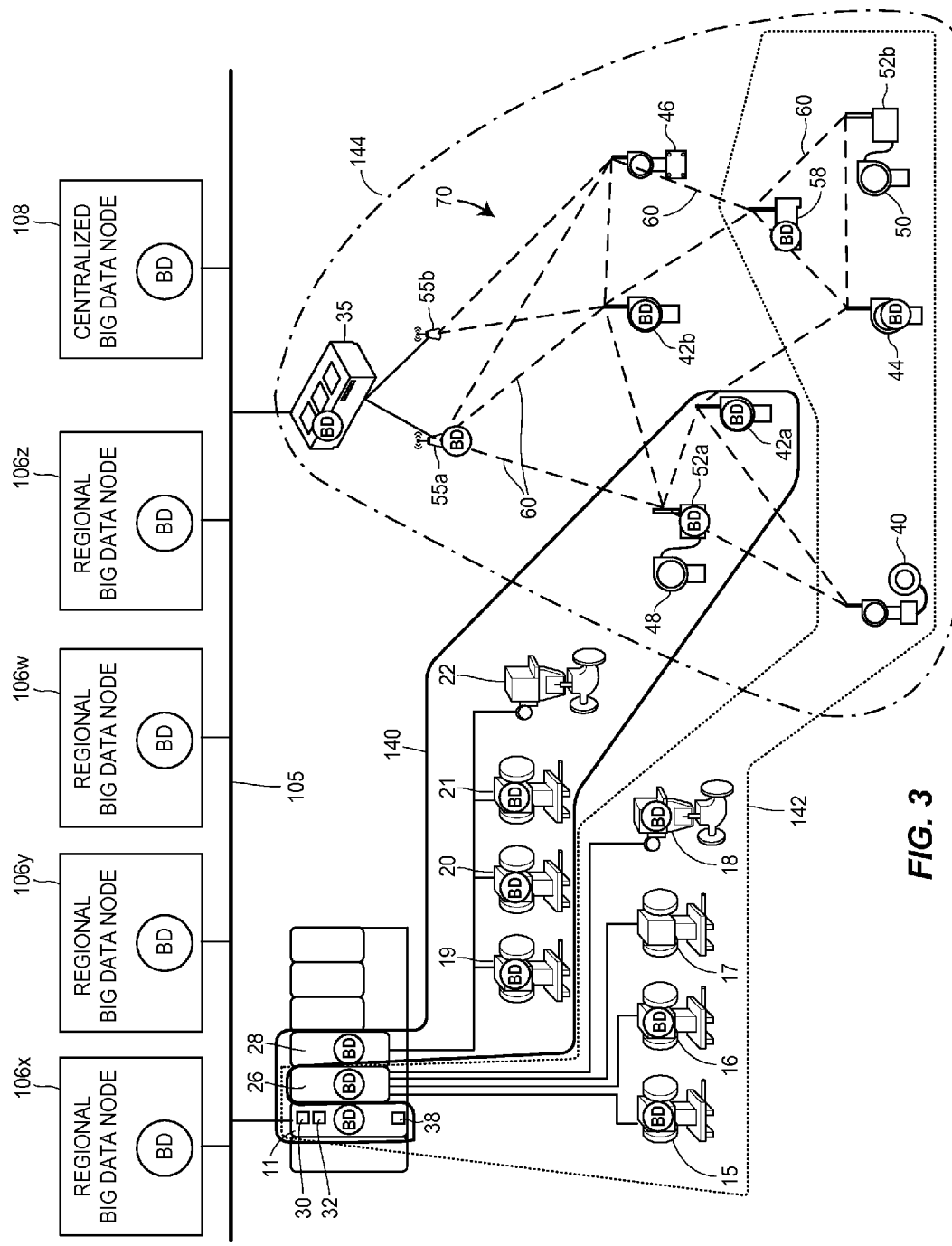
FIG. 3 is a block diagram illustrating an example process plant or process control system that includes example big data devices or nodes that support regional big data in the process control big data network of FIG. 1.

A detailed block diagram illustrating example local big data provider devices 102 that support regional big data in a process plant or process control environment is shown in FIG. 3. While the devices 102 are discussed with reference to the process plant or process control system 10 of FIG. 1, the local big data provider devices 102 may be used in or with other process plants or process control systems to support regional big data therein.

In FIG. 3, a "BD" reference signifies that a particular device or node supports big data. In particular, FIG. 3 shows multiple local big data provider devices 11, 15, 16, 18, 19, 20, 21, 26, 28,35, 42a, 42b, 44, 52a, 55a, 58, regional big data nodes 106w-106z, and a centralized big data node 108. Of course, the number and types of big data nodes shown in FIG. 3 is non-limiting and is for illustrative purposes. A process plant or process control system that supports regional big data may include at least one big data provider node and at least one regional big data node.

As previously discussed, local big data provider devices 102 may include devices whose main function is to automatically generate and/or receive process control data that is used to perform functions to control a process in real-time in the process plant environment 10. For instance, process controllers, field devices and I/O devices are examples of possible local big data devices 102. In a process plant environment 10, process controllers receive signals indicative of process measurements made by field devices, process this information to implement a control routine, and generate control signals that are sent over wired or wireless communication links to other field devices to control the operation of a process in the plant 10. Typically, at least one field device performs a physical function (e.g., opening or closing a valve, increase or decrease a temperature, etc.) to control the operation of a process, and some types of field devices may communicate with controllers using I/O devices. Process controllers, field devices, and I/O devices may be wired or wireless, and any number and combination of wired and wireless process controllers, field devices and I/O devices may be the local big data provider nodes 102a-102n of the process control big data network 100.

For example, FIG. 3 illustrates a process controller 11 that is communicatively connected to wired field devices 15-22 via input/output (I/O) cards 26 and 28, and is communicatively connected to wireless field devices 40-46 via a wireless gateway 35 and a process control big data network backbone 105 (which may be similar to the network backbone discussed in FIG. 1). In an embodiment, the controller 11 may be communicatively connected to the wireless gateway 35 using one or more communications networks other than the backbone 105, such as by using any number of other wired or wireless communication links.

The controller 11, which may be, by way of example, the DeltaV™ controller sold by Emerson Process Management, may operate to implement a batch process or a continuous process using at least some of the field devices 15-22 and 40-46. In an embodiment, in addition to being communicatively connected to the process control big data network backbone 105, the controller 11 may also be communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 3, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 3 includes a processor 30 that implements or oversees one or more process control routines (e.g., that are stored in a memory 32). The processor 30 is configured to communicate with the field devices 15-22 and 40-46 and with other nodes communicatively connected to the controller 11. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object oriented programming, ladder logic, sequential function charts, function block diagrams, or using any other software programming language or design paradigm. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using what are commonly referred to as function blocks, wherein each function block is an object or other part (e.g., a subroutine) of an overall control routine and operates in conjunction with other function blocks (via communications called links) to implement process control loops within the process control system 10. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may include one or more control routines 38 that may implement one or more control loops, and may be performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 3, the field devices 15-18 are standard 4-20 mA devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-21 and/or at least some of the big data I/O cards 26, 28 additionally or alternatively communicate with the controller 11 (and/or other big data nodes) using the big data network backbone 105.

In FIG. 3, the wireless field devices 40-46 communicate in a wireless network 70 using a wireless protocol, such as the WirelessHART® protocol. Such wireless field devices 40-46 may directly communicate with one or more other devices or nodes of the process control big data network 100 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the big data network backbone 105 or to another process control communications network.

The wireless gateway 35 may provide access to various wireless devices 40-58 of the wireless communications network 70. In particular, the wireless gateway 35 provides communicative coupling between the wireless devices 40-58, the wired devices 11-28, and/or other nodes or devices of the process control big data network 100. For example, the wireless gateway 35 may provide communicative coupling by using the big data network backbone 105 and/or by using one or more other communications networks of the process plant 10. Additionally or alternatively, wireless big data provider devices 42a, 42b, 44, 52a, 55a, 58 may each be directly connected in a wired or wireless manner to the big data network backbone 105. For example, at least some of the devices 42a, 42b, 44, 52a, 55a, 58 may communicate both over the wireless network 70 and the big data network backbone 105.

Similar to the wired field devices 15-22, the wireless field devices 40-46 of the wireless network 70 may perform physical control functions within the process plant 10, e.g., opening or closing valves or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some scenarios, the wireless network 70 may include non-wireless devices. For example, a field device 48 of FIG. 3 may be a legacy 4-20 mA device and a field device 50 may be a traditional wired HART® device. To communicate within the network 70, the field devices 48 and 50 may be connected to the wireless communications network 70 via a wireless adaptor 52a or 52b. The wireless adaptors 52a, 52b may support other communication protocols such as Foundation® Fieldbus, PROFIBUS, DeviceNet, etc. Furthermore, the wireless network 70 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. The wireless devices 40-46 and 52-58 may communicate with each other and with the wireless gateway 35 over wireless links 60 of the wireless communications network 70, and/or via the big data network backbone 105. As shown in FIG. 3, the adaptor 52a, access point 55a, and router 58 each supports process control big data as indicated by the "BD."

In some embodiments, the local big data provider devices 102 of the process control big data network 100, may include other wireless access points (not shown in FIG. 3) that communicate using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Said other wireless access points each may or may not support process control big data.

In some embodiments, the local big data provider devices or nodes 102 may include one or more gateways (not shown in FIG. 3) to systems that are external to the immediate process control system 10. Typically, such systems are customers or suppliers of information generated or operated on by the process control system 10. For example, a gateway may communicatively connect the immediate process plant 10 with another process plant, an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems. Said other wireless access points each may or may not support process control big data.

Although FIG. 3 only illustrates a single controller 11 with a finite number of field devices 15-22 and 40-46, wireless gateways 35, wireless adaptors 52, access points 55, routers 58, and wireless process control communications networks 70, this is only an illustrative and non-limiting embodiment. Any number of controllers 11 may be included in the local big data provider nodes 102 of the process control big data network 100, and any of the controllers 11 may communicate with any number of wired or wireless devices and networks 15-22, 40-46, 35, 52, 55, 58 and 70 to control a process in the plant 10.

To implement or support regional big data, the various wired or wireless devices shown in FIG. 3 may be grouped into respective regions. Once grouped, data that is generated, collected, received, or otherwise observed by any or all devices in each region is delivered or streamed to a respective regional big data node 106w-106z. Each regional big data node 106w-106z in FIG. 3 includes a respective regional big data appliance (e.g., an instance of the regional big data appliance 116a-116m discussed in FIG. 1) via which big data is received, stored as regional big data, and accessed or requested. Further, each regional big data node 106w-106z includes one or more analytics functions, routines, operations, or processes that may individually and/or cooperatively operate on at least some of the regional big data.

A region may be formed according to any desired manner. In an illustrative example shown in FIG. 3, three different regions 140, 142 and 144 are formed according to a functional manner. For example, the region 140, depicted within the solid line, represents an example control loop that executes in the process plant 10 to operate or control at least a portion of a process in real-time. As such, the control loop 140 includes various process control devices such as the controller 11, I/O card 28, wireless adaptor 52a, and field devices 19-22, 42a and 48. Each field device 19-22, 42a and 48 in the control loop 140 may generate process control data, receive process control data, and/or transmit process control data to the controller 11 to enable the controller 11 to oversee the operation of the control loop 140. The field devices 19-22 are wired devices that are connected to the controller 11 via the I/O card 28. The field device 42a is a wireless device that communicates with the controller 11 via the wireless gateway 35 and the network backbone 105. The field device 48 is another wired device that is coupled to the adaptor 52a, which in turn communicates with the gateway 35 to communicate with the controller 11. Although FIG. 3 shows the field devices 19-22, 42 and 48 as being positioned next to one another in the control loop 140, the field devices 19-22, 42 and 48 may be in fact located in different parts of the process plant 10, but are grouped together based on the functions that they perform to implement the control loop 140.

Similarly, the region 142, depicted within the dotted line, represents another example control loop that executes in the process plant 10 to operate or control another portion of the process (or another process altogether) in real-time. Thus, the control loop 142 includes various process control devices such as the controller 11, I/O card 26, wireless adaptor 52b, router 58, and field devices 15-18, 40, 44 and 50. The controller 11 oversees the operation of the control loop 142 by processing information and data received from each of the field devices 15-18, 40, 44 and 50. As such, the wired field devices 15-18 are communicatively connected to the controller 11 via the I/O card 26, while the wireless field device 40 is communicatively connected to the controller 11 via the gateway 35 and the network backbone 105. Further, the wired field device 50 is coupled to the adaptor 52b which, along with the wireless field device 44, communicates with the router 58 to communicatively connect to the controller 11 via the gateway 35 and the network backbone 105. Similar to as noted above, the field devices 15-18, 40, 44 and 50 may be located in different parts of the process plant 10, but are grouped together according to their functions in implementing the control loop 142.

FIG. 3 also shows the region 144, which is depicted within the dash-dotted line. Instead of representing a control loop, the region 144 represents an example communications network that serves to provide network routing functionality and administration. In particular, the region 144 represents the wireless communications network 70, which includes the wireless gateway 35, wireless adaptors 52a, 52b, access points 55a, 55b, and router 58. Each device included in the region 144 performs the function of routing and transmitting wireless packets. The wireless gateway 35 also performs traffic management and administrative functions (e.g., resource management, performance adjustments, network fault mitigation, monitoring traffic, security, etc.), as well as routes traffic to and from wired networks that are in communicative connection with the wireless network 70.

Any or all data generated or provided by the local big data provider nodes of the regions 140, 142 and 144 may be streamed to respective regional big data nodes 106x-106z for historization, analysis, storage, usage, and/or access. Specifically, process control data related to the regions 140 and 142, such as measurement data (e.g., outputs, rates, etc.), configuration data (e.g., setpoints, configuration changes, etc.), batch data (e.g., batch recipes, batch conditions, etc.), event data (e.g., alarms, process control events, etc.), continuous data (e.g., parameter values, video feeds, etc.), calculated data (e.g., internal states, intermediate calculations, etc.), and/or diagnostic data, may be streamed to the regional big data nodes 106x and 106y, respectively. Network data related to the region 144 (e.g., bandwidth, traffic, network configuration, etc.) may be streamed to the regional big data node 106z.

At each of the regional big data nodes 106x-106z, computation or data analysis may be performed on at least some of the received data to determine meaningful patterns, correlations, trends, etc., and, in general, to generate new knowledge. Examples of the computation or data analysis techniques may be found in aforementioned U.S. application Ser. No. 62/060,408, entitled "DATA PIPELINE FOR PROCESS CONTROL SYSTEM ANALYTICS." As a result of the performed computation or analysis, the regional big data nodes 106x-106z may produce learned knowledge such as a new set of data points or observations, descriptive statistics related to the data, correlations in the data, new or modified models for the data, etc. In some cases, the resulting learned knowledge includes a new or modified application, a new or modified function, a new or modified routine, a new or modified learning analysis, a new or modified service, etc. For example, the resulting learned knowledge may be a newly created inferred function, which can be used for mapping new data examples.

In an embodiment, based on the resulting learned knowledge, each regional big data node 106x-106z may update, improve or modify the operations of its respective region. For example, the regional big data node 106x modifies certain process parameter values to optimize the process being controlled in the region 140 based on the resulting learned knowledge. In another example, the regional big data node 106y updates a diagnostic routine for its region 142 based on the resulting learned knowledge. In still another example, the regional big data node 106z determines a better data path to route network traffic in the region 144 based on the resulting learned knowledge.

In some embodiments, the regional big data nodes 106x-106z transmit their learned knowledge to another regional big data node 106w to support layered or leveled learning. The regional big data node 106w functions to supervise one or more regions. As such, the regional big data node 106w may perform further analysis or learning on at least some of the received learned knowledge in order to generate additional learned knowledge about the one or more regions 140, 142, 144 that it oversees or services, which then may be distributed to any or all of their respective regional big data nodes 106x-106z. Additionally or alternatively, the regional big data node 106w and/or any of the regional big data nodes 106x-106z may cause any resulting learned knowledge to be transmitted to the centralized big data node 108 or other process control big data nodes in the process control system 10. The centralized big data node 108 may operate on the aggregated learned knowledge to generate knowledge on a plant-wide basis.

Figure 4:
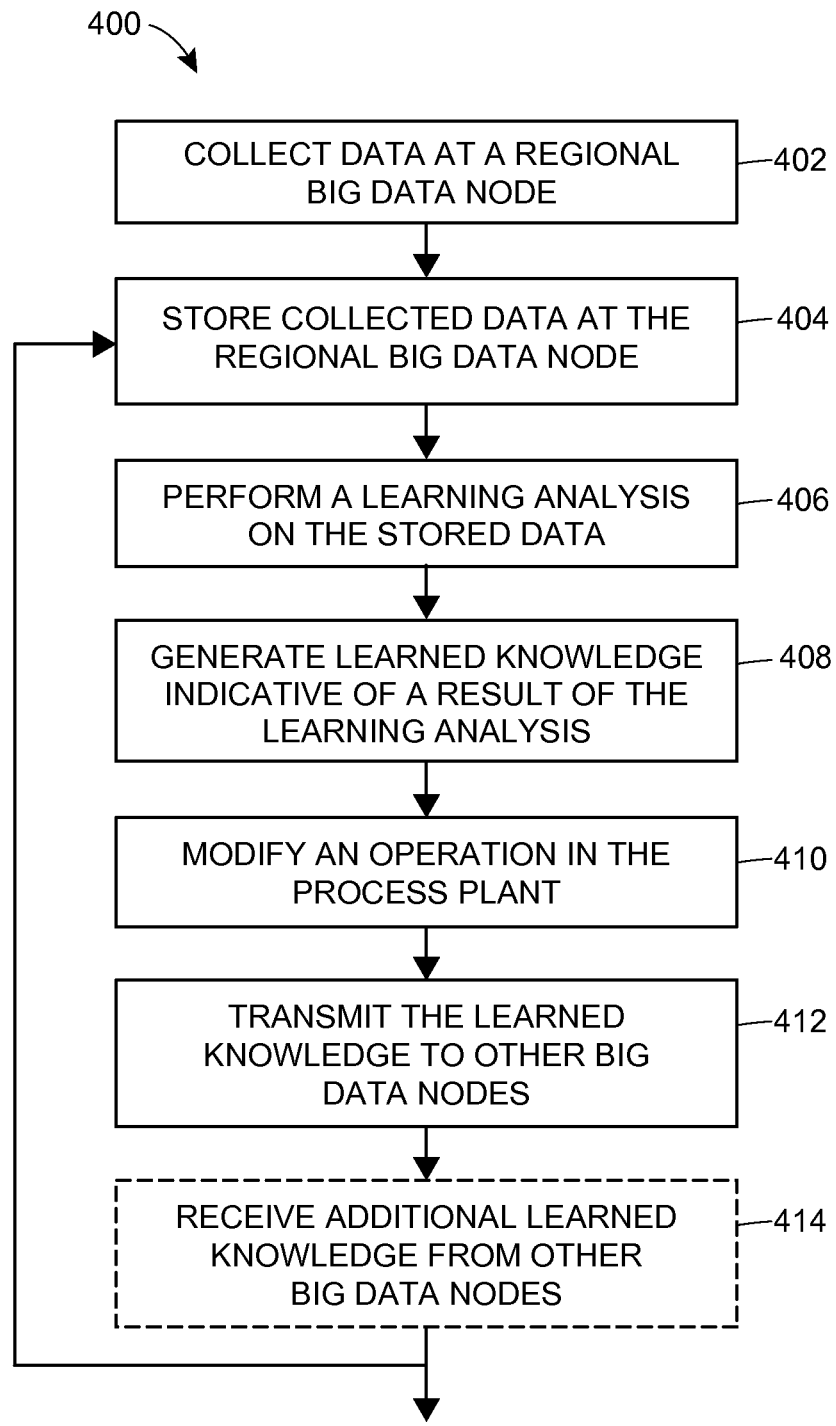
FIG. 4 is a flow diagram of an example method of supporting regional big data in a process control system or process plant.

FIG. 4 illustrates a flow diagram of an example method 400 for supporting regional big data in process plants and process control systems. The method 400 may be performed, for example, by the regional big data nodes 106a-106m of FIG. 1 and the regional big data nodes 106w-106z of FIG. 3. For ease of discussion, and not for limitation purposes, the method 400 is described with simultaneous reference to FIGS. 1-3.

At a block 402, data corresponding to process control plants or networks may be received, obtained, and/or collected at a regional big data node, e.g., one of the regional big data nodes 106. The regional big data node 106 is communicatively connected to and services a "region" or a group of local big data provider nodes 102 and/or other big data nodes 104 that are related according to some or at least one of a geographical, physical, functional, logical, or other desired manner, e.g., the regions 140, 142 or 144. Accordingly, any data that is generated or provided by the group of local big data provider nodes 102 and/or other big data nodes 104 is delivered or streamed to the regional big data node 106 for collection. The regional big data node 106 may be communicatively coupled, via one or more network interfaces, to a communications network of a process plant or process control system, such as via the network backbone 105 of the process control system big data network 100. The data collected or received at the regional big data node 106 may include measurement data, event data, batch data, calculated data, configuration data, continuous data, and/or learned data. Generally, the collected data typically includes all types of data that are generated by, created by, received at, or otherwise observed by the respective region connected to the regional big data node 106.

At a block 404, the collected data may be stored in a regional big data appliance at the regional big data node 106, such as the regional big data appliance 116. For example, the data and its respective timestamp are stored as an entry in a big data storage 120 of the regional big data appliance 116. In embodiments where multiple values of the data are obtained over time (block 402), each value is stored, along with its respective timestamp, in the same entry or in a different entry of the big data storage 120.

At a block 406, one or more learning analyses are performed on at least a portion of the stored regional data, e.g., to learn, predict, or discover new knowledge, meaningful relationships, patterns, correlations, trends, etc. The one or more learning analyses (e.g., as performed by one or more of the big data analyzers 126) may include any number of data discovery and/or learning algorithms and techniques such as, e.g., a partial least square analysis, a random forest, a pattern recognition, a predictive analysis, a correlation analysis, a principle component analysis, classification analysis, probabilistic analysis, data mining, data discovery, or other machine learning techniques including heuristic learning (such as previously discussed). In some cases, the regional big data appliance 116 analyzes at least some of the stored regional big data to extract data patterns, which are then evaluated to discover patterns of interest that represent knowledge based on interestingness measures. In some cases, the regional big data appliance 116 determines which relevant learning analysis or analyses to use, and determines what portions (or in some cases, all) of the stored data on which the learning analysis or analyses is to operate. For example, the determination of the learning analysis includes a selection or a derivation of the learning analysis. As such, the selection or derivation of the learning analysis may be based on one or more properties of at least a portion of the stored regional big data, e.g., based on the respective timestamp associated with the stored data, based on offsets or other measures present in the stored data, based on the type of field devices that the stored data originated from, based on certain identified clusters within the stored data, etc.

At a block 408, learned knowledge that is indicative of a result of the learning analysis is created or generated. For example, created or generated learned knowledge includes learned data, additional data that was previously unknown to the regional big data node 106, and/or one or more learned applications, functions, routines, services, learning analyses, or modifications thereto. In another example, the learned knowledge includes a prediction based on one or more properties of at least a portion of the stored regional big data. The learned knowledge may provide new information that is useful for any number of prediction, modeling, diagnostics, and/or trouble shooting purposes. Typically, but not necessarily, the learned knowledge is stored in the regional big data appliance 116 of the regional big data node 106.

At a block 410, based on the learned knowledge (block 408), the method 400 includes causing a change in or modifying one or more operations, e.g., in the respective region 140, 142, 144 serviced by the regional big data node 106. For example, learned knowledge could result in a modification of process parameters for a process that is being controlled or executed in one or more respective regions. In another example, learned knowledge could result in a creation of a new process model which is subsequently implemented in a respective region. Generally, at the block 410, the change or modification to the one or more operations of the respective region 140, 142, 144 may include a change or modification to a local big data node (and/or one or more of its operations) that is included in the respective region 140, 142, 144, and/or a change or modification to another non-big data device (and/or one or more of its operations) that is connected to a local big data node included in the respective region. For example, a change in a control parameter of a non-big data or legacy device that is connected to an adaptor for the process control big data network may be effected using the block 410 of the method 400.

In some embodiments, the block 410 includes causing a change in or a modification to one or more operations in a region other than the respective region 140, 142, 144 serviced by the regional big data node 106. For example, the regional big data node 106 may transmit the learned knowledge to another regional big data node servicing another region, and the recipient regional big data node may cause a change or modification in operation of some portion of its respective region.

Indeed, in some embodiments, the method 400 includes causing at least some of the learned knowledge to be transmitted to another big data node (such as to a local big data node within its own region, to a centralized big data node 108, or to another regional big data node 106 servicing another region), e.g., for the recipient big data node to utilize in its respective learning analyses and/or operations (block 412). In an embodiment, the learned knowledge leads to a modification of an operation being performed by the recipient node and/or by another device coupled to the recipient node (block 410). As such, the method 400 may cause an indication of the modification to be transmitted to the recipient big data node in conjunction with the learned knowledge.

In some embodiments, the method 400 includes performing in-context searches based on the learned knowledge (not shown). For example, during a maintenance check, a user may wish to determine the status of various valves in the process plant. As such, the method 400 may utilize the learned knowledge to find the nearest valves that are located next to the user, the nearest valves that were serviced in the past month, the nearest valves that are in need of maintenance, etc. The results of the in-context searches may be provided to a remote or local user interface, or may be logged.

In some embodiments, the method 400 includes providing recommendations to users (e.g., outside operators, maintenance workers, engineers, etc.) based on the learned knowledge (not shown), e.g., at a remote or local user interface, or written to a log. More particularly, the method 400 may provide recommendations to the users in the context of where they are working in the process plant. For example, an operator may wish to make adjustments for a measurement process that executes in the process plant. As such, the method 400 may utilize the learned knowledge to provide the operator with details on which regions in the process plant are relevant to the making the adjustments, and which regions do not need to be looked at.

In some embodiments, only one of the blocks 410 or 412 is included in the method 400. In other embodiments, the blocks 410 and 412 are executed in sequence so that the regional big data node first modifies the operation of its respective region based on the learned knowledge (block 410) and then transmits that learned knowledge to other recipient big data nodes (block 412), or vice versa. In still other embodiments of the method 400, the blocks 410 and 412 are executed in parallel.

The method 400 optionally includes receiving additional learned knowledge (block 414) from other big data nodes (e.g., from other regional big data nodes 106, centralized big data nodes 108, and/or other big data nodes 104) of the process plant. The regional big data node 106 may store (block 404) the received learned knowledge, and may perform one or more subsequent learning analyses (block 406) on the additional learned knowledge and at least a portion of the locally stored regional big data. Based on the outputs of the subsequent learning analysis or analyses, additional learned knowledge may be created, generated (block 408), and optionally stored at the regional big data node 106. In some situations, based on the newly generated learned knowledge, one or more operations occurring in the respective region connected to the regional big data node are modified (block 410), and/or at least some of the new learned knowledge is transmitted to one or more other recipient big data nodes (block 412) or applications.

In some embodiments, the method 400 is automatically or autonomously performed or executed without any real-time user input. For example, user input is not required or used to execute and/or to initiate the execution of any of the steps of any embodiment of the method 400. In other embodiments, the method 400 is performed or executed with or based on real-time user input.

Embodiments of the techniques described in the present disclosure may include any number of the following aspects, either alone or combination:

1. A regional big data node for supporting big data in a process plant controlling a process. The regional big data node comprises a network interface that communicatively connects the regional big data node to one of a plurality of regions of the process plant, wherein the one of the plurality of regions comprises a plurality of local big data nodes, each of which transmits, in real-time, data generated from the control of the process by the process plant as the process is being controlled in real-time. The regional big data node also comprises a big data storage area comprising one or more tangible, non-transitory, computer-readable storage media configured to store regional big data. Further, the regional big data node comprises a big data receiver configured to receive the data transmitted by the plurality of local big data nodes and received at the regional big data node via the network interface, and store the received data in the big data storage area. Still further, the regional big data node comprises a big data analyzer configured to: perform a learning analysis on at least a portion of the regional big data, generate learned knowledge based on a result of the learning analysis, and cause a change in operations of at least a portion of the process plant based on the result of the learning analysis including causing the learned knowledge to be transmitted to a recipient big data node corresponding to the at least the portion of the process plant.

2. The regional big data node of the previous aspect, wherein the one of the plurality of regions is formed according to at least one of a geographical, physical, functional, or logical grouping.

3. The regional big data node of any one of the previous aspects, wherein: the plurality of local big data nodes of the one of the plurality of regions includes at least one of: a process control device, a gateway device, an access point, a routing device, a historian device, or a network management device included in the process plant. The process control device is one of a controller, a field device performing a physical function to control at least a part of the process, or an input/output (I/O) device communicatively coupling the controller and the field device.

4. The regional big data node of any one of the previous aspects, wherein the regional big data includes multiple types of data, and a set of types of data includes continuous data, event data, measurement data, batch data, calculated data, diagnostic data, configuration data, data corresponding to the learned knowledge, and/or data corresponding to other learned knowledge.

5. The regional big data node of any one of the previous aspects, wherein the learning analysis includes at least one of: a partial least square regression analysis, a random forest, a pattern recognition, a predictive analysis, a correlation analysis, a principle component analysis, data mining, data discovery, or other machine learning techniques including heuristic learning.

6. The regional big data node of any one of the previous aspects, wherein the change in the operations of the at least the portion of the process plant based on the result of the learning analysis comprises a modification to an operation being performed in the one of the plurality of regions based on the learned knowledge. The big data analyzer is further configured to cause an indication of the modification to be transmitted to the recipient big data node in conjunction with the learned knowledge.

7. The regional big data node of any one of the previous aspects, wherein the learned knowledge is first learned knowledge, the learning analysis is a first learning analysis, and the one of the plurality of regions is a first region. The big data receiver is further configured to receive second learned knowledge generated by another big data node of a second region of the plurality of regions. The big data analyzer is still further configured to at least one of (i) cause a modification, based on the received second learned knowledge, to an operation being performed in the first region, or (ii) perform a second learning analysis on the received second learned knowledge and at least some of the regional big data.

8. The regional big data node of any one of the previous aspects, wherein the another big data node of the second region is a regional big data node servicing the second region.

9. The regional big data node of any one of the previous aspects, wherein the learned knowledge includes at least one of: additional data resulting from control of the process that was previously unknown to the regional big data node, an application, a service, a routine, a function, or another learning analysis.

10. The regional big data node of any one of the precious aspects, wherein the big data analyzer is further configured to perform in-context searching based on the learned knowledge.

11. The regional big data node of any one of the previous aspects, wherein the big data analyzer is further configured to provide recommendations to users based on the learned knowledge.

12. The regional big data node of any one of the previous aspects, wherein the network interface communicatively connects the regional big data node to a user interface big data node. The user interface big data node includes a user interface and one or more respective analytics routines. The big data receiver is further configured to receive, using the network interface, data generated based on a result of the one or more respective analytics routines executing at the user interface big data node based on a user input received via the user interface of the user interface big data node, and store the data received from the user interface big data node in the big data storage area. The big data analyzer is further configured to perform the learning analysis or another learning analysis on another portion of the regional big data including the data received from the user interface big data node.

13. The regional big data node of any one of the previous aspects, wherein the network interface communicatively connects the regional big data node to a centralized big data node. The centralized big data node includes one or more respective analytics routines. The big data receiver of the regional big data node is further configured to receive, using the network interface, data generated based on a result of the one or more analytics routines executing at the centralized big data node, and store the data received from the centralized big data node in the big data storage area. The big data analyzer of the regional big data node is further configured to at least one of: perform the learning analysis or another learning analysis on another portion of the regional big data including the data received from the centralized big data node, or modify an operation based on the data received from the centralized big data node.

14. The regional big data node of any one of the previous aspects, wherein at least a portion of at least one of the big data receiver or the big data analyzer is included on one or more integrated circuit chips.

15. The regional big data node of any one of the previous aspects, wherein at least a portion of at least one of the big data receiver or the big data analyzer comprises computer-executable instructions stored on a memory of the regional big data node and executable by a processor of the regional big data node.

16. A method of utilizing regional big data to improve the operation of a process plant controlling a process. The method may be performed, at least in part, by the regional big data node of any one of the previous aspects. The method comprises collecting data at one or more regional big data nodes of the process plant. Each of the one or more regional big data nodes corresponds to a respective region included in a plurality of regions of the process plant. The collected data includes data transmitted by a respective plurality of local big data nodes of the respective region, and each local big data node transmits, in real-time, respective data resulting from on-line operations of the respective region of the each local big data node. The method also comprises storing the collected data as regional big data at the one or more regional big data nodes. Further, the method comprises performing, by the one or more regional big data nodes, one or more learning analyses on at least a portion of the regional big data, and generating learned knowledge based on results of the one or more learning analyses. Still further, the method comprises causing a change in operations of at least a portion of the process plant based on the results of the one or more learning analysis including transmitting the learned knowledge to a recipient big data node corresponding to the at least the portion of the process plant.

17. The method of the previous aspect, wherein the method is autonomously performed without or with using any real-time user input.

18. The method of any one of the previous aspects, wherein each of the one or more regional big data nodes is formed according to one of a geographical, physical, functional, or logical grouping.

19. The method of any one of the previous aspects, wherein collecting the data at the one or more regional big data nodes comprises collecting data transmitted by at least one of: a process control device, a gateway device, an access point, a routing device, a historian device, a user interface device, or a network management device of the process plant. The process control device is one of a controller, a field device performing a physical function to control at least a part of the process, or an input/output (I/O) device communicatively coupling the controller and the field device. The collected data includes at least one type of data included in a set of data types comprising continuous data, event data, measurement data, batch data, calculated data, diagnostic data, configuration data, and data corresponding to other learned knowledge.

20. The method of any one of the previous aspects, wherein the learned knowledge is first learned knowledge, and wherein collecting the data at the one or more regional big data nodes comprises collecting second learned knowledge generated by the one or more regional big data nodes or by another big data node of the process plant.

21. The method of any one of the previous aspects, further comprising at least one of: selecting a first at least one of the one or more learning analyses, or deriving a second at least one of the one or more learning analyses.

22. The method of any one of the previous aspects, wherein generating the learned knowledge comprises generating at least one of: additional data that was previously unknown to the one or more regional big data nodes, a new or modified application, a new or modified function, a new or modified routine, a new or modified learning analysis, or a new or modified service.

23. The method of any one of the previous aspects, wherein the at least the portion of the regional big data is a first at least a portion of the regional big data. The method further comprises performing the new or modified learning analysis on a second at least a portion of the regional big data.

24. The method of any one of the previous aspects, wherein performing the one or more learning analyses comprises performing at least one of a machine learning analysis, a predictive analysis, data mining, or data discovery.

24. The method of any one of the previous aspects, wherein performing the one or more learning analyses by the one or more regional big data nodes comprises performing the one or more learning analyses by more than one regional big data nodes, and generating the learned knowledge based on the results of the one or more learning analyses comprises generating the learned knowledge based on results of the one or more learning analyses performed by the more than one regional big data nodes.

26. A system for supporting regional big data in a process plant. The system comprises one or more regional big data nodes, a plurality of local big data nodes, and a communications network communicatively connecting the one or more regional big data nodes and the plurality of local big data nodes. The system may perform at least a part of any one of the preceding methods, in an embodiment. The plurality of local big data nodes are arranged into a plurality of regions, each of which is serviced by a respective regional big data node included in the one or more regional big data nodes. The respective regional big data node is configured to collect data generated in real-time by a set of local big data nodes associated with the respective region serviced by the respective regional big data node, where the data is generated in real-time by the set of local big data nodes due to real-time control of a process in the process plant. The respective regional big data node is also configured to store the collected data as respective regional big data at a big data storage area included in the respective regional big data node. Further, the respective regional big data node is configured to perform, using a big data analyzer included in the respective regional big data node, a learning analysis on at least a portion of the stored respective regional big data, and to generate learned knowledge based on the result of the performed learning analysis. Still further, the regional big data node is configured to at least one of (i) store, at the big data storage area, the learned knowledge as additional respective regional big data, or (ii) transmit the learned knowledge to a recipient big data node included in the process plant.

27. The system of the previous aspect, wherein the plurality of local big data nodes are arranged into the plurality of regions according to at least one of a geographical, physical, functional, or logical grouping.

28. The system of any one of the previous aspects, wherein the learned knowledge includes at least one of: additional data resulting from the real-time control of the process, an application, a function, a service, a routine, or another learning analysis.

29. The system of any one of the previous aspects, wherein the result of the performed learning analysis includes a prediction based on properties of the at least the portion of the stored respective regional big data.

30. The system of any one of the previous aspects, further comprising a user interface big data node having a respective learning analysis, and wherein the collected data is first collected data. The respective regional big data node is further configured to collect second data generated by a performance of the respective learning analysis at the user interface big data node. Additionally, the respective regional big data node is further configured to store the second collected data at the big data storage area included in the respective regional big data node. The respective regional big data node is further configured to at least one of: perform the learning analysis or another learning analysis on a set of stored respective regional data including the second collected data, or cause the second collected data to be transmitted to another big data node.

31. The system of any one of the previous aspects, further comprising at least one of a centralized big data node or another type of big data node, and wherein the collected data is first collected data. The respective regional big data node is further configured to collect second data generated by a performance of a learning analysis at the at least one of the centralized big data node or the another type of big data node. Additionally, the respective regional big data node is further configured to store the second collected data at the big data storage area included in the respective regional big data node, and perform the learning analysis or another learning analysis on a set of stored respective regional data including the second collected data.

32. The system of any one of the previous aspects, wherein the data generated in real-time by the set of local big data nodes includes data generated in real-time by one or more of: a field device, a controller, an input/output (I/O) device having an interface to the controller and an interface to the field device, a gateway device, an access point, a routing device, a historian device, or a network management device. The controller is configured to receive a set of inputs, determine, based on the set of inputs, a value of an output, and cause the output to be transmitted to the field device to control the process executed by the process plant. The field device is configured to perform a physical function based on the output of the controller to control the process.

33. The system of any one of the previous aspects, wherein the learned knowledge is transmitted to the recipient big data node, and wherein the recipient big data node causes at least one of (i) a modification, based on the received learned knowledge, to the recipient big data node, or (ii) a modification to a provider of big data to the recipient big data node.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A regional data node for supporting a process plant controlling a process, the regional data node comprising:
   a network interface that communicatively connects, via a first communications network, the regional data node to one of a plurality of regions of the process plant, the one of the plurality of regions comprising a plurality of local data nodes, each of which transmits, in real-time, via the first communication network, data generated from the control of the process by the process plant as the process is being controlled in real-time, the process executing in real-time to receive raw materials and generate output product from the raw materials, and the process including at least one physical process;
   a regional data storage area comprising one or more tangible, non-transitory, computer-readable storage media configured to store regional data;
   a regional data receiver configured to receive the data transmitted by the plurality of local data nodes and received at the regional data node via the network interface, and store the received data in the regional data storage area; and
   a regional data analyzer configured to:
      perform a learning analysis on at least a portion of the regional data;
      generate learned knowledge based on a result of the learning analysis; and
      cause a change in operations to control the process in real-time of at least a portion of the process plant based on the result of the learning analysis, including causing the learned knowledge to be transmitted, via the first communications network, to a recipient data node included in the at least the portion of the process plant, and
   wherein:
      the process plant includes (i) a field device performing a physical function to control at least a part of the process in real-time, (ii) a controller configured to receive a set of inputs, determine, based on the set of inputs, a value of an output, and cause the output to be transmitted to the field device to control the field device to perform the physical function, (iii) an input/output (I/O) device communicatively coupling the controller and the field device, and (iv) a second communications network via which the controller exchanges signals with other controllers in real-time to thereby control the process in real-time to generate the output product from the raw materials; and
      at least one of the field device, the controller, or the I/O device is included in the plurality of local data nodes of the one of the plurality of regions of the process plant.

2. The regional data node of claim 1, wherein the one of the plurality of regions is formed according to at least one of a geographical, physical, functional, or logical grouping.

3. The regional data node of claim 1, wherein:
   the plurality of local data nodes of the one of the plurality of regions includes at least two of: one or more process control devices, a gateway device, an access point, a routing device, a historian device, or a network management device included in the process plant; and
   the one or more process control devices includes at least one of the controller, the field device performing the physical function to control the at least the part of the process in real-time, or the input/output (I/O) device communicatively coupling the controller and the field device.

4. The regional data node of claim 1, wherein the regional data includes multiple types of data, and a set of types of data includes continuous data, event data, measurement data, batch data, calculated data, diagnostic data, configuration data, data corresponding to the learned knowledge, and data corresponding to other learned knowledge.

5. The regional data node of claim 1, wherein the learning analysis includes at least one of: a partial least square regression analysis, a random forest, a pattern recognition, a predictive analysis, a correlation analysis, a principle component analysis, data mining, data discovery, or other machine learning techniques including heuristic learning.

6. The regional data node of claim 1, wherein:
   the change in the operations to control the process in real-time of the at least the portion of the process plant based on the result of the learning analysis comprises a modification to an operation being performed in the one of the plurality of regions to control the process in real-time, the modification based on the learned knowledge; and
   the regional data analyzer is further configured to cause an indication of the modification to be transmitted to the recipient data node in conjunction with the learned knowledge.

7. The regional data node of claim 1, wherein:
   the learned knowledge is first learned knowledge, the learning analysis is a first learning analysis, and the one of the plurality of regions is a first region;
   the regional data receiver is further configured to receive second learned knowledge generated by another regional data node of a second region of the plurality of regions, the another regional data node included in the first communications network; and
   the regional data analyzer is further configured to at least one of (i) cause a modification, based on the received second learned knowledge, to an operation being performed in the first region to control the process in real-time, or (ii) perform a second learning analysis on the received second learned knowledge and at least some of the regional data.

8. The regional data node of claim 7, wherein the another regional data node of the second region is a regional data node servicing the second region.

9. The regional data node of claim 1, wherein the learned knowledge includes at least one of: additional data resulting from control of the process that was previously unknown to the regional data node, an application, a service, a routine, a function, or another learning analysis.

10. The regional data node of claim 1, wherein the regional data analyzer is further configured to perform in-context searching based on the learned knowledge.

11. The regional data node of claim 1, wherein the regional data analyzer is further configured to provide recommendations to users based on the learned knowledge.

12. The regional data node of claim 1, wherein:
the network interface communicatively connects the regional data node to a user interface data node, the user interface data node including a user interface and one or more respective analytics routines, and the user interface data node included in the first communications network;
the regional data receiver is further configured to receive, using the network interface, data generated based on a result of the one or more respective analytics routines executing at the user interface data node based on a user input received via the user interface of the user interface data node, and store the data received from the user interface data node in the regional data storage area; and
the regional data analyzer is further configured to perform the learning analysis or another learning analysis on another portion of the regional data including the data received from the user interface data node.

13. The regional data node of claim 1, wherein:
the network interface communicatively connects the regional data node to a centralized data node;
the centralized data node is included in the first communications network;
the centralized data node includes one or more respective analytics routines;
the regional data receiver of the regional data node is further configured to receive, using the network interface, data generated based on a result of the one or more analytics routines executing at the centralized data node, and store the data received from the centralized data node in the regional data storage area; and
at least one of:
the regional data analyzer is further configured to perform the learning analysis or another learning analysis on another portion of the regional data including the data received from the centralized data node, or
the regional data node is configured to modify an operation based on the data received from the centralized data node.

14. The regional data node of claim 1, wherein at least a portion of at least one of the regional data receiver or the regional data analyzer is included on one or more integrated circuit chips.

15. The regional data node of claim 1, wherein at least a portion of at least one of the regional data receiver or the regional data analyzer comprises computer-executable instructions stored on a memory of the regional data node and executable by a processor of the regional data node.

16. A method of utilizing regional data to improve the operation of a process plant controlling a process, the method comprising:
collecting, via a first communications network of the process plant, data at one or more regional data nodes of the process plant, wherein:
each of the one or more regional data nodes corresponds to a respective region included in a plurality of regions of the process plant,
the collected data includes data transmitted, via the first communications network, by a respective plurality of local data nodes of the respective region,
each local data node transmits, in real-time via the first communications network, respective data resulting from on-line operations to control the process in real-time of the respective region of the each local data node,
the process plant includes (i) a field device performing a physical function to control the process in real-time, the process including a physical process that executes to receive raw materials and generate output product from the raw materials, (ii) a controller configured to receive a set of inputs, determine, based on the set of inputs, a value of an output, and cause the output to be transmitted to the field device to control the field device to perform the physical function, (iii) an input/output (I/O) device communicatively coupling the controller and the field device, and (iv) a second communications network via which the controller exchanges signals with other controllers in real-time to thereby control the process in real-time to generate the output product from the raw materials, and
the respective plurality of local data nodes includes at least one of the field device, the controller, or the I/O device;
storing the collected data as regional data at the one or more regional data nodes;
performing, by the one or more regional data nodes, one or more learning analyses on at least a portion of the regional data;
generating learned knowledge based on results of the one or more learning analyses; and
causing a change in operations to control the process in real-time of at least a portion of the process plant based on the results of the one or more learning analysis, including transmitting the learned knowledge to a recipient data node of the at least the portion of the process plant.

17. The method of claim 16, wherein the method is autonomously performed without using any real-time user input.

18. The method of claim 16, wherein each of the one or more regional data nodes is formed according to one of a geographical, physical, functional, or logical grouping.

19. The method of claim 16, wherein:
collecting the data at the one or more regional data nodes comprises collecting data transmitted by at least one of: at least one process control device, a gateway device, an access point, a routing device, a historian device, a user interface device, or a network management device of the process plant;
the at least one process control device includes at least one of the controller, the field device performing the physical function to control at least a part of the process, or the input/output (I/O) device communicatively coupling the controller and the field device; and
the collected data includes at least one type of data included in a set of data types comprising continuous data, event data, measurement data, batch data, calculated data, diagnostic data, configuration data, and data corresponding to other learned knowledge.

20. The method of claim 16, wherein the learned knowledge is first learned knowledge, and wherein collecting the data at the one or more regional data nodes comprises collecting second learned knowledge generated by the one or more regional data nodes or by another data node of the process plant, the one or more regional data nodes and the another data node included in the first communications network.

21. The method of claim 16, further comprising at least one of: selecting a first at least one of the one or more learning analyses, or deriving a second at least one of the one or more learning analyses.

22. The method of claim 16, wherein generating the learned knowledge comprises generating at least one of: additional data that was previously unknown to the one or more regional data nodes, a new or modified application, a new or modified function, a new or modified routine, a new or modified learning analysis, or a new or modified service.

23. The method of claim 16, wherein:
the at least the portion of the regional data is a first at least a portion of the regional data; and
the method further comprises performing the new or modified learning analysis on a second at least a portion of the regional data.

24. The method of claim 16, wherein performing the one or more learning analyses comprises performing at least one of a machine learning analysis, a predictive analysis, data mining, or data discovery.

25. The method of claim 16, wherein:
performing the one or more learning analyses by the one or more regional data nodes comprises performing the one or more learning analyses by more than one regional data nodes, the more than one regional data nodes included in the first communications network; and
generating the learned knowledge based on the results of the one or more learning analyses comprises generating the learned knowledge based on results of the one or more learning analyses performed by the more than one regional data nodes.

26. A system for supporting regional data in a process plant comprising:
one or more regional data nodes;
a plurality of local data nodes; and
a first communications network communicatively connecting the one or more regional data nodes and the plurality of local data nodes, the plurality of local data nodes being arranged into a plurality of regions, each of which is serviced by a respective regional data node included in the one or more regional data nodes, wherein the respective regional data node is configured to:
collect data generated in real-time by a set of local data nodes associated with the respective region serviced by the respective regional data node, the data generated in real-time by the set of local data nodes due to real-time control of a process in the process plant, the process including a physical process that executes to receive raw materials and generate output product from the raw materials;
store the collected data as respective regional data at a regional data storage area included in the respective regional data node; and
perform, using a regional data analyzer included in the respective regional data node, a learning analysis on at least a portion of the stored respective regional data, and
generate learned knowledge based on the result of the performed learning analysis; and
at least one of (i) store, at the regional data storage area, the learned knowledge as additional respective regional data, or (ii) transmit the learned knowledge to a recipient data node included in the process plant,
wherein the process plant includes:
a field device performing a physical function to control the process in real-time;
a controller configured to receive a set of inputs, determine, based on the set of inputs, a value of an output, and cause the output to be transmitted to the field device to control the field device to perform the physical function;
an input/output (I/O) device disposed between the field device and the controller and having an interface to the field device and an interface to the controller; and
a second communications network via which the controller exchanges signals with other controllers to thereby control the process in real-time to generate the output product from the raw materials; and
wherein at least one of the field device, the controller, or the I/O device is included in the set of local data nodes.

27. The system of claim 26, wherein the plurality of local data nodes are arranged into the plurality of regions according to at least one of a geographical, physical, functional, or logical grouping.

28. The system of claim 26, wherein the learned knowledge includes at least one of: additional data resulting from the real-time control of the process, an application, a function, a service, a routine, or another learning analysis.

29. The system of claim 26, wherein the result of the performed learning analysis includes a prediction based on properties of the at least the portion of the stored respective regional data.

30. The system of claim 26, further comprising a user interface data node having a respective learning analysis, and wherein:
the collected data is first collected data,
the user interface data node is included in the first communications network, and
the respective regional data node is further configured to:
collect second data generated by a performance of the respective learning analysis at the user interface data node;
store the second collected data at the regional data storage area included in the respective regional data node; and
at least one of: perform the learning analysis or another learning analysis on a set of stored respective regional data including the second collected data, or cause the second collected data to be transmitted via the first communications network to another data node.

31. The system of claim 26, further comprising at least one of a centralized data node or another type of data node, and wherein:
the collected data is first collected data; and
the respective regional data node is further configured to:
collect second data generated by a performance of a learning analysis at the at least one of the centralized data node or the another type of data node, the centralized data node and the another type of data node included in the first communications network;
store the second collected data at the regional data storage area included in the respective regional data node; and
perform the learning analysis or another learning analysis on a set of stored respective regional data including the second collected data.

32. The system of claim 26, wherein the data generated in real-time by the set of local data nodes includes data generated in real-time by two or more of:
the field device;
the controller;
the input/output (I/O) device;

a gateway device;
an access point;
a routing device;
a historian device; or
a network management device.

33. The system of claim 26, wherein the learned knowledge is transmitted to the recipient data node, and wherein the recipient data node causes at least one of (i) a modification, based on the received learned knowledge, to the recipient data node, or (ii) a modification to a provider of data to the recipient data node.

* * * * *